(12) United States Patent
Chong et al.

(10) Patent No.: US 9,134,179 B2
(45) Date of Patent: Sep. 15, 2015

(54) COLOR SELECTON SYSTEM BASED ON DESIRED COLOR EMOTION AND COLOR HARMONY

(75) Inventors: Patrick Tak-Fu Chong, Mount Arlington, NJ (US); Carl Minchew, Mountain Lakes, NJ (US); Kathleen Ewing, Franklin Lakes, NJ (US)

(73) Assignee: Benjamin Moore & Co., Montvale, NJ (US)

(*) Notice: Subject to any disclaimer, the term of this patent is extended or adjusted under 35 U.S.C. 154(b) by 445 days.

(21) Appl. No.: 12/668,352

(22) PCT Filed: Jul. 11, 2008

(86) PCT No.: PCT/US2008/069823
§ 371 (c)(1),
(2), (4) Date: Jan. 8, 2010

(87) PCT Pub. No.: WO2009/009745
PCT Pub. Date: Jan. 15, 2009

(65) Prior Publication Data
US 2010/0194776 A1 Aug. 5, 2010

Related U.S. Application Data

(60) Provisional application No. 60/929,743, filed on Jul. 11, 2007.

(51) Int. Cl.
*G09G 5/02* (2006.01)
*G01J 3/52* (2006.01)
*G06Q 30/06* (2012.01)

(52) U.S. Cl.
CPC .................. *G01J 3/528* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 5,311,212 A * | 5/1994 | Beretta | 345/591 |
| 5,504,499 A | 4/1996 | Horie et al. | |
| 6,870,544 B2 * | 3/2005 | Blanchard et al. | 345/589 |
| 7,054,794 B2 | 5/2006 | Brunt et al. | |
| 7,136,074 B2 * | 11/2006 | Hussie | 345/591 |
| 7,180,524 B1 * | 2/2007 | Axelrod | 345/593 |
| 7,193,632 B2 | 3/2007 | Rice et al. | |
| 7,230,629 B2 | 6/2007 | Reynolds et al. | |
| 7,330,585 B2 | 2/2008 | Rice et al. | |

(Continued)

FOREIGN PATENT DOCUMENTS

| | | |
|---|---|---|
| GB | 2 402 830 A | 12/2004 |
| WO | 2005124301 A2 | 12/2005 |

OTHER PUBLICATIONS

Li-Chen Ou et al., "A Study of Colour Emotion and Colour Preference. Part I: Colour Emotions for Single Colours". Color Research and Application. Jun. 2004; pp. 232-240, vol. 29, No. 3. United Kingdom.

(Continued)

*Primary Examiner* — Aaron M Richer
*Assistant Examiner* — Anh-Tuan V Nguyen
(74) *Attorney, Agent, or Firm* — The H.T. Than Law Group

(57) ABSTRACT

Color selection and display methods and devices in which colors can be displayed according to color harmony and color emotion and feedback obtained on color emotion and color harmony evoked by selected color and/or color combinations.

23 Claims, 20 Drawing Sheets

(56) References Cited

U.S. PATENT DOCUMENTS

| | | | |
|---|---|---|---|
| 7,474,314 B2* | 1/2009 | Minchew et al. | 345/581 |
| 7,561,303 B2* | 7/2009 | Groarke et al. | 358/1.9 |
| 7,817,851 B2* | 10/2010 | Stokes | 382/167 |
| 8,013,869 B2* | 9/2011 | Voliter et al. | 345/591 |
| 2002/0184611 A1* | 12/2002 | Endejan | 717/113 |
| 2003/0063130 A1* | 4/2003 | Barbieri et al. | 345/833 |
| 2004/0046802 A1* | 3/2004 | Wright et al. | 345/810 |
| 2005/0140691 A1* | 6/2005 | Rice | 345/593 |
| 2005/0156943 A1* | 7/2005 | Fujioka et al. | 345/589 |
| 2005/0275736 A1* | 12/2005 | Chiu et al. | 348/272 |
| 2006/0001677 A1 | 1/2006 | Webb et al. | |
| 2006/0066629 A1 | 3/2006 | Norlander et al. | |
| 2006/0087517 A1* | 4/2006 | Mojsilovic | 345/593 |
| 2006/0098025 A1 | 5/2006 | Jang et al. | |
| 2006/0181723 A1* | 8/2006 | Edge | 358/1.9 |
| 2006/0195369 A1 | 8/2006 | Webb et al. | |
| 2007/0176942 A1* | 8/2007 | Itagaki et al. | 345/589 |
| 2008/0003547 A1* | 1/2008 | Woolfe et al. | 434/98 |
| 2008/0123941 A1* | 5/2008 | Stokes | 382/162 |
| 2008/0221734 A1* | 9/2008 | Nagao et al. | 700/259 |
| 2010/0215264 A1* | 8/2010 | Nakamura | 382/167 |

OTHER PUBLICATIONS

Li-Chen Ou et al., A Study of Colour Emotion and Colour Preference. Part II: Colour Emotions for Two-Colour Combinations'. Color Research and Application. Aug. 2004; pp. 292-298, vol. 29, No. 4. United Kingdom.

Li-Chen Ou et al., "A Study of Colour Emotion and Colour Preference. Part III: Colour Preference Modeling". Color Research and Application. Oct. 2004; pp. 381-389, vol. 29, No. 5. United Kingdom.

Li-Chen Ou and M. Ronnier Luo. "A Color Harmony Model for Two-Colour Combinations". Color Research and Application. Jun. 2006; pp. 191-204, vol. 31, No. 3. United Kingdom.

Tetsuya Sato et al. "Numerical Expression of Colour Emotion and Its Application". Proceedings of AIC 2003 Bangkok: Color Communication and Management.

Ming-Chuen Chuang and Li-Chen Ou. "Influence of a Holistic Color Interval on Color Harmony". Color Research and Application. Feb. 2001; pp. 29-39, vol. 26, No. 1. Republic of China.

Ferenc Szabo et al. "Visual Experiments on Colour Harmony: A Formula and a Rendering Index". CIE 26th Session. Beijing 2007.

Nathan Moroney et al. "The CIECAM02 Color Appearance Model". IS&T/SID Tenth Color Imaging Conference. Scottsdale, Arizona.

Laszlo Neumann et al. "Computational Color Harmony Based on Coloroid System". Jun. 2005. Institute of Computer Graphics and Algorithms. Vienna Austria.

Tetsuya Sato et al. "Development of Sportswear Design Assisted System Based on Numerical Expression of Colour Emotion". 2000; pp. 27-42, vol. 21. Japan.

Tetsuya Sato et al. "Development of Sportswear Design Assisted System Based on Numerical Expression of Colour Emotion". 2000; pp. 27-42, vol. 21. Japan. [English Translation].

Parry Moon and Domina Eberle Spencer. "Geometric Formulation of Classical Color Harmony". Journal of the Optical Society of America. Jan. 1944; pp. 46-59, vol. 34, No. 1. Massachusetts.

Parry Moon and Domina Eberle Spencer. "Aesthetic Measure Applied to Color Harmony". Journal of the Optical Society of America. Apr. 1944; pp. 234-242, vol. 34, No. 4. Massachusetts.

Parry Moon and Domina Eberle Spencer. "Area in Color Harmony". Journal of the Optical Society of America. Feb. 1944; pp. 93-103, vol. 34, No. 2. Massachusetts.

Xingmei Wang et al. "Influence of Area Proportion on Colour Harmony". Apr. 24-26, 2007. International Conference on Colour Harmony. Budapest, Hungary.

Helen Skelton and James H. Nobbs. "Predicting a Description of Subjective COLOUR with a Neutral Network". Proceedings of the International Conference and Exhibition held in Harrogate, England. Apr. 1998; pp. 107-123, vol. III- Colour Physics.

Tetsuya Sato et al. "Japanese and UK Visual Scales". Proceedings of Colour Science. 1998; pp. 100-103. Harrogate, United Kingdom.

International Search Report and Written Opinion issued in connection with corresponding International Patent Application No. PCT/US2008/069823 on Oct. 9, 2008.

S. Sueeprasan et al. "An Investigation of Colour Emotions Using Two-Colour Combinations". AIC Colour 05-10th Congress of the International Colour Association. 2005; pp. 271-274.

Ferenc Szabo et al. "Experimental Modeling of Colour Harmony". Color Research and Application. 2009; pp. 34-44. Wiley Periodicals, Inc. Veszprem, Hungary.

Brochure—Benjamin Moore's Video Color Planner. 1990.

Ronnier Luo. Presentation Slides—Technology for Colour Communication and Design. Ind. Color Challenge, ISCC/AATCC, Charlotte. Feb. 23, 2007.

O. Da Pos and V. Valenti. "Warm and Cold Colours". Proceedings of AIC 2007—Color Science for Industry. pp. 41-44.

Ou, Li-Chen. "Quantification of Colour Emotion and Colour Harmony." University of Derby. Dec. 2004.

Hawkyard, CJ and M. Kelly. "A New Approach to the Assessment of Standard Depth." JSDC. vol. 116. Nov. 2000.

European Search Report issued in connection with the corresponding European Patent Application No. 08 77 2503 on Oct. 22, 2012.

Ou, L-C et al. The Effect of Culture on Colour Emotion and Preference. AIC Colour 05—10th Congress of the International Colour Association. pp. 259-262.

* cited by examiner

Table 1  Specifications of the 35 colour samples in CIELAB system

| Sample | Tone | Hue | L* | a* | b* | C* | h |
|---|---|---|---|---|---|---|---|
| 1 | Vivid | Red | 35.0 | 46.4 | 23.2 | 51.8 | 27 |
| 2 | | Orange | 56.7 | 30.6 | 52.1 | 60.4 | 60 |
| 3 | | Yellow | 79.2 | 2.6 | 61.3 | 61.4 | 88 |
| 4 | | Green | 34.1 | -25.8 | 17.0 | 30.8 | 147 |
| 5 | | Cyan | 34.6 | -17.8 | -8.9 | 19.9 | 206 |
| 6 | | Blue | 35.8 | -2.4 | -33.4 | 33.5 | 266 |
| 7 | | Purple | 35.7 | 36.9 | -23.6 | 43.8 | 327 |
| 8 | Pale | Red | 79.8 | 21.9 | 10.9 | 24.5 | 26 |
| 9 | | Orange | 79.6 | 13.1 | 22.2 | 25.8 | 59 |
| 10 | | Green | 79.5 | -19.4 | 12.6 | 23.1 | 147 |
| 11 | | Blue | 80.6 | -1.9 | -24.3 | 24.4 | 265 |
| 12 | | Purple | 80.3 | 19.5 | -12.1 | 23.0 | 328 |
| 13 | Dull | Red | 56.9 | 21.8 | 10.6 | 24.2 | 26 |
| 14 | | Yellow | 56.4 | 1.0 | 25.1 | 25.1 | 88 |
| 15 | | Cyan | 57.0 | -12.9 | -6.3 | 14.3 | 206 |
| 16 | Dark | Orange | 34.0 | 12.1 | 21.3 | 24.5 | 60 |
| 17 | | Green | 34.0 | -18.6 | 12.3 | 22.3 | 146 |
| 18 | | Blue | 35.0 | -1.4 | -24.1 | 24.2 | 267 |
| 19 | Light Greyish | Yellow | 79.6 | 0.9 | 12.9 | 13.0 | 86 |
| 20 | | Cyan | 79.9 | -6.8 | -2.6 | 7.3 | 203 |
| 21 | | Purple | 79.6 | 9.8 | -6.1 | 11.6 | 328 |
| 22 | Greyish | Red | 56.9 | 11.0 | 5.3 | 12.2 | 26 |
| 23 | | Orange | 56.6 | 6.2 | 11.1 | 12.7 | 61 |
| 24 | | Green | 56.6 | -10.0 | 6.5 | 11.9 | 147 |
| 25 | | Blue | 57.1 | -0.9 | -12.3 | 12.4 | 266 |
| 26 | | Purple | 57.1 | 9.4 | -5.9 | 11.2 | 328 |
| 27 | Dark Greyish | Red | 34.1 | 10.5 | 5.3 | 11.7 | 27 |
| 28 | | Yellow | 34.0 | 0.6 | 12.3 | 12.3 | 87 |
| 29 | | Cyan | 34.2 | -6.3 | -2.9 | 7.0 | 204 |
| 30 | | Purple | 34.6 | 9.2 | -5.6 | 10.8 | 329 |
| 31 | Achromatic | Black | 2.3 | -0.1 | -0.4 | 0.4 | 262 |
| 32 | | Dark Grey | 34.2 | -0.2 | 0.2 | 0.3 | 124 |
| 33 | | Mid Grey | 56.9 | -0.1 | 0.3 | 0.3 | 115 |
| 34 | | Light Grey | 80.0 | 3.2 | -0.9 | 3.4 | 345 |
| 35 | | White | 100.0 | -0.1 | 0.3 | 0.3 | 106 |

FIG. 4

Table 2: Specifications for Selected E1 Colors    62-1

| Row-Column | Code | Color Name | L* | a* | b* | C*ab | hab | E |
|---|---|---|---|---|---|---|---|---|
| 1-1 | 15-10 | Color A | 43.9 | 56.6 | 36.4 | 67.3 | 32.8 | 2.16 |
| 2-1 | 15-20 | Color B | 47.6 | 56.6 | 30.2 | 64.2 | 28.1 | 2.10 |
| 3-1 | 15-30 | Color C | 52.8 | 55.3 | 21.5 | 59.3 | 21.2 | 1.95 |
| 4-1 | 15-40 | Color D | 66.4 | 44.7 | 7.7 | 45.3 | 9.8 | 1.35 |
| 5-1 | 15-50 | Color E | 76.0 | 30.3 | 2.4 | 30.4 | 4.6 | 0.68 |
| 6-1 | 15-60 | Color F | 86.7 | 18.1 | 1.0 | 18.1 | 3.1 | 0.22 |
| 7-1 | 15-70 | Color G | 91.8 | 9.4 | 1.2 | 9.5 | 7.1 | 0.03 |
| 1-2 | 16-10 | Color AA | 45.4 | 57.4 | 40.1 | 70.1 | 34.9 | 2.25 |
| 2-2 | 16-20 | Color BB | 49.0 | 57.1 | 34.9 | 66.9 | 31.4 | 2.17 |
| 3-2 | 16-30 | Color CC | 54.8 | 54.4 | 26.1 | 60.3 | 25.6 | 1.95 |
| 4-2 | 16-40 | Color DD | 68.2 | 42.1 | 12.3 | 43.8 | 16.3 | 1.25 |
| 5-2 | 16-50 | Color EE | 79.9 | 27.6 | 5.2 | 28.1 | 10.7 | 0.57 |
| 6-2 | 16-60 | Color FF | 88.1 | 16.0 | 2.9 | 16.2 | 10.1 | 0.17 |
| 7-2 | 16-70 | Color GG | 93.1 | 7.7 | 2.1 | 8.0 | 15.2 | 0.01 |
| ... | | | | | | | | |
| 1-36 | 97-10 | Color AB | 37.4 | 49.5 | 18.5 | 52.8 | 20.5 | 1.61 |
| 2-36 | 97-20 | Color BBB | 42.1 | 50.9 | 10.8 | 52.1 | 12.0 | 1.65 |
| 3-36 | 97-30 | Color CCC | 48.6 | 51.2 | 2.6 | 51.2 | 2.9 | 1.64 |
| 4-36 | 97-40 | Color DDD | 64.7 | 40.4 | -5.2 | 40.7 | 352.6 | 1.11 |
| 5-36 | 97-50 | Color EEE | 77.6 | 27.2 | -6.3 | 27.9 | 347.0 | 0.53 |
| 6-36 | 97-60 | Color FFF | 86.4 | 16.5 | -4.1 | 17.0 | 345.9 | 0.16 |
| 7-36 | 97-70 | Color GGG | 92.1 | 8.7 | -1.5 | 8.9 | 350.1 | 0.01 |
| 1-37 | 98-10 | Color AC | 39.1 | 51.7 | 25.9 | 57.8 | 26.6 | 1.79 |
| 2-37 | 98-20 | Color BC | 43.5 | 53.0 | 18.8 | 56.2 | 19.6 | 1.80 |
| 3-37 | 98-30 | Color CC | 49.5 | 52.7 | 9.9 | 53.6 | 10.7 | 1.74 |
| 4-37 | 98-40 | Color DC | 64.7 | 42.3 | 0.2 | 42.3 | 0.3 | 1.21 |
| 5-37 | 98-50 | Color EC | 77.4 | 28.4 | -2.9 | 28.5 | 354.2 | 0.58 |
| 6-37 | 98-60 | Color FC | 86.5 | 17.1 | -2.2 | 17.2 | 352.7 | 0.18 |
| 7-37 | 98-70 | Color GC | 92.2 | 8.7 | -0.6 | 8.7 | 356.1 | 0.02 |

FIG. 8A

Table 3: Specifications for Selected E2 Colors                                     62-2

| Row-Column | Code | Color Name | L* | a* | b* | C*$_{ab}$ | h$_{ab}$ | E |
|---|---|---|---|---|---|---|---|---|
| 1-1 | 12-10 | Color BA | 90.3 | 8.2 | 2.2 | 8.5 | 14.8 | -0.03 |
| 2-1 | 12-20 | Color BBC | 85.0 | 13.1 | 3.2 | 13.5 | 13.6 | 0.02 |
| 3-1 | 12-30 | Color BC | 78.1 | 17.4 | 1.2 | 17.4 | 4.0 | 0.08 |
| 4-1 | 12-40 | Color BD | 70.8 | 21.3 | 3.1 | 21.5 | 8.2 | 0.18 |
| 5-1 | 12-50 | Color BE | 62.2 | 25.3 | 3.0 | 25.5 | 6.7 | 0.31 |
| 6-1 | 12-60 | Color BF | 52.5 | 26.7 | 5.2 | 27.2 | 11.0 | 0.34 |
| 7-1 | 12-70 | Color BG | 40.5 | 27.3 | 11.5 | 29.6 | 22.9 | 0.39 |
| 1-2 | 13-10 | Color BAA | 87.9 | 9.1 | 4.6 | 10.2 | 26.7 | -0.04 |
| 2-2 | 13-20 | Color BAB | 83.2 | 12.5 | 3.6 | 13.0 | 15.9 | -0.03 |
| 3-2 | 13-30 | Color BCC | 76.9 | 17.4 | 5.1 | 18.1 | 16.2 | 0.08 |
| 4-2 | 13-40 | Color BDD | 68.5 | 20.4 | 6.8 | 21.5 | 18.3 | 0.13 |
| 5-2 | 13-50 | Color BEE | 62.3 | 24.1 | 6.7 | 25.0 | 15.4 | 0.27 |
| 6-2 | 13-60 | Color BFF | 54.5 | 23.8 | 7.5 | 24.9 | 17.5 | 0.21 |
| 7-2 | 13-70 | Color BGG | 42.2 | 24.2 | 9.4 | 25.9 | 21.2 | 0.21 |
| ... | ... | ... | | | | | | |
| 1-39 | 88-10 | Color CA | 31.1 | 24.7 | 7.3 | 25.8 | 16.5 | 0.24 |
| 2-39 | 88-20 | Color CB | 35.6 | 28.2 | 4.5 | 28.5 | 9.1 | 0.40 |
| 3-39 | 88-30 | Color CC | 42.2 | 30.7 | 0.2 | 30.7 | 0.5 | 0.53 |
| 4-39 | 88-40 | Color CD | 60.6 | 26.8 | -4.1 | 27.1 | 351.2 | 0.38 |
| 5-39 | 88-50 | Color CE | 74.6 | 19.4 | -4.9 | 20.0 | 345.8 | 0.14 |
| 6-39 | 88-60 | Color CF | 84.8 | 12.4 | -3.0 | 12.8 | 346.4 | -0.01 |
| 7-39 | 88-70 | Color CG | 91.7 | 6.6 | -0.9 | 6.6 | 352.3 | -0.04 |

FIG. 8B

Table 4: Specifications for Selected E3 Colours    62-3

| Row-Column | Code | Color Name | L* | a* | b* | C*ab | hab | E |
|---|---|---|---|---|---|---|---|---|
| 1-1 | 61-10 | Color 1 | 87.0 | 5.7 | 2.7 | 6.3 | 25.3 | -0.14 |
| 2-1 | 61-20 | Color 2 | 82.9 | 7.5 | 2.3 | 7.9 | 17.2 | -0.18 |
| 3-1 | 61-30 | Color 3 | 75.5 | 10.8 | 4.0 | 11.5 | 20.5 | -0.20 |
| 4-1 | 61-40 | Color 4 | 66.3 | 13.6 | 4.2 | 14.3 | 17.3 | -0.21 |
| 5-1 | 61-50 | Color 5 | 50.4 | 16.7 | 5.5 | 17.6 | 18.3 | -0.18 |
| 6-1 | 61-60 | Color 6 | 42.3 | 17.4 | 4.6 | 18.0 | 14.8 | -0.17 |
| 7-1 | 61-70 | Color 7 | 32.7 | 17.8 | 6.9 | 19.1 | 21.3 | -0.13 |
| 1-2 | 62-10 | Great | 31.0 | 16.5 | 14.1 | 21.7 | 40.4 | -0.11 |
| 2-2 | 62-20 | Better | 32.6 | 17.0 | 13.5 | 21.7 | 38.5 | -0.10 |
| 3-2 | 62-30 | Best | 35.8 | 16.9 | 12.1 | 20.8 | 35.7 | -0.13 |
| 4-2 | 62-40 | Wonderful | 51.4 | 15.1 | 8.4 | 17.3 | 29.3 | -0.24 |
| 5-2 | 62-50 | Fantastic | 67.9 | 11.3 | 5.5 | 12.6 | 25.9 | -0.28 |
| 6-2 | 62-60 | Glorious | 80.5 | 8.0 | 4.4 | 9.1 | 28.5 | -0.20 |
| 7-2 | 62-70 | Stupendous | 89.1 | 4.8 | 3.5 | 6.0 | 35.9 | -0.11 |
| ... | ... | ... | | | | | | |
| 1-41 | 10-10 | Color 11 | 23.7 | 5.3 | -2.4 | 5.8 | 335.9 | -0.69 |
| 2-41 | 10-20 | Color 12 | 28.0 | 8.5 | -6.2 | 10.5 | 324.0 | -0.57 |
| 3-41 | 10-30 | Color 13 | 35.1 | 11.6 | -10.2 | 15.4 | 318.5 | -0.41 |
| 4-41 | 10-40 | Color 14 | 56.1 | 11.6 | -11.0 | 16.0 | 316.6 | -0.34 |
| 5-41 | 10-50 | Color 15 | 72.4 | 8.9 | -9.1 | 12.7 | 314.4 | -0.27 |
| 6-41 | 10-60 | Color 16 | 83.6 | 5.8 | -5.2 | 7.8 | 318.4 | -0.19 |
| 7-41 | 10-70 | Color 17 | 91.2 | 3.2 | -2.0 | 3.8 | 327.3 | -0.09 |
| 1-42 | 13-10 | Color 100 | 90.6 | 3.2 | 3.6 | 4.8 | 48.2 | -0.10 |
| 2-42 | 13-20 | Color 101 | 85.8 | 6.1 | 0.5 | 6.1 | 4.5 | -0.16 |
| 3-42 | 13-30 | Color 102 | 79.8 | 9.0 | -4.3 | 9.9 | 334.5 | -0.19 |
| 4-42 | 13-40 | Color 103 | 74.4 | 12.1 | -7.3 | 14.1 | 329.1 | -0.15 |
| 5-42 | 13-50 | Color 104 | 65.9 | 16.2 | -7.5 | 17.9 | 335.1 | -0.08 |
| 6-42 | 13-60 | Color 105 | 48.4 | 16.8 | -8.7 | 19.0 | 332.6 | -0.16 |
| 7-42 | 13-70 | Color 106 | 36.3 | 16.5 | -7.5 | 18.1 | 335.6 | -0.20 |

<u>FIG. 8C</u>

Table 5: Specifications for selected E4 Colours          / 62-4

| Row-Column | Code | Colour Name | L* | a* | b* | C*$_{ab}$ | h$_{ab}$ | E |
|---|---|---|---|---|---|---|---|---|
| 1-1 | 52-10 | A | 24.0 | 4.4 | 5.8 | 7.3 | 52.8 | -0.69 |
| 2-1 | 52-20 | B | 29.4 | 6.3 | 4.9 | 8.0 | 38.0 | -0.70 |
| 3-1 | 52-30 | C | 37.7 | 7.7 | 3.5 | 8.5 | 24.6 | -0.70 |
| 4-1 | 52-40 | D | 58.4 | 7.5 | 2.1 | 7.7 | 15.8 | -0.58 |
| 5-1 | 52-50 | E | 74.7 | 5.0 | 0.8 | 5.1 | 8.7 | -0.38 |
| 6-1 | 52-60 | F | 85.3 | 3.2 | 1.2 | 3.4 | 20.7 | -0.21 |
| 7-1 | 52-70 | G | 92.0 | 1.7 | 1.7 | 2.4 | 45.9 | -0.09 |
| 1-2 | 53-10 | H | 30.7 | 7.1 | 8.9 | 11.4 | 51.5 | -0.61 |
| 2-2 | 53-20 | I | 34.2 | 7.0 | 8.3 | 10.9 | 49.7 | -0.65 |
| 3-2 | 53-30 | J | 37.5 | 6.7 | 7.2 | 9.9 | 47.0 | -0.69 |
| 4-2 | 53-40 | K | 54.1 | 4.9 | 5.3 | 7.2 | 46.9 | -0.70 |
| 5-2 | 53-50 | L | 70.6 | 3.1 | 3.4 | 4.6 | 47.1 | -0.49 |
| 6-2 | 53-60 | M | 82.2 | 2.2 | 3.0 | 3.7 | 54.1 | -0.27 |
| 7-2 | 53-70 | N | 90.0 | 0.9 | 2.6 | 2.8 | 70.7 | -0.12 |
| ... | ... | | | | | | | |
| 1-27 | 65-10 | O | 25.5 | 5.7 | 6.7 | 8.7 | 49.6 | -0.65 |
| 2-27 | 65-20 | P | 31.6 | 7.1 | 4.3 | 8.3 | 31.2 | -0.69 |
| 3-27 | 65-30 | Q | 40.5 | 8.0 | 1.9 | 8.2 | 13.6 | -0.69 |
| 4-27 | 65-40 | R | 61.4 | 6.6 | -0.4 | 6.6 | 356.3 | -0.57 |
| 5-27 | 65-50 | S | 76.5 | 3.9 | -1.4 | 4.2 | 339.9 | -0.37 |
| 6-27 | 65-60 | T | 86.7 | 2.3 | 0.0 | 2.3 | 0.4 | -0.19 |
| 7-27 | 65-70 | U | 92.5 | 1.0 | 1.0 | 1.4 | 44.7 | -0.08 |

FIG. 8D

1. Select input format, either XYZ or R%
2. Select light source for XYZ input
3. Select 2-colour or 3-colour combinations
4. Calculate from input of R%
    4.1 Transform all R% to $(XYZ)_{D65}$, $(XYZ)_A$, $(XYZ)_{TL84}$, $(XYZ)_{F2}$ and $(XYZ)_{BMD}$. Predict all non D65 XYZ values to those under D65 via CAT02 chromatic adaptation transform
    4.2 Calculate CE and CH values
5. Calculate from input of XYZ
    5.1 If it is $(XYZ)_{D65}$, calculate CE and CH values
    5.2 If it is not $(XYZ)_{D65}$, use CAT02 to transform all the others to $(XYZ)_{D65}$ and then calculate CE and CH values

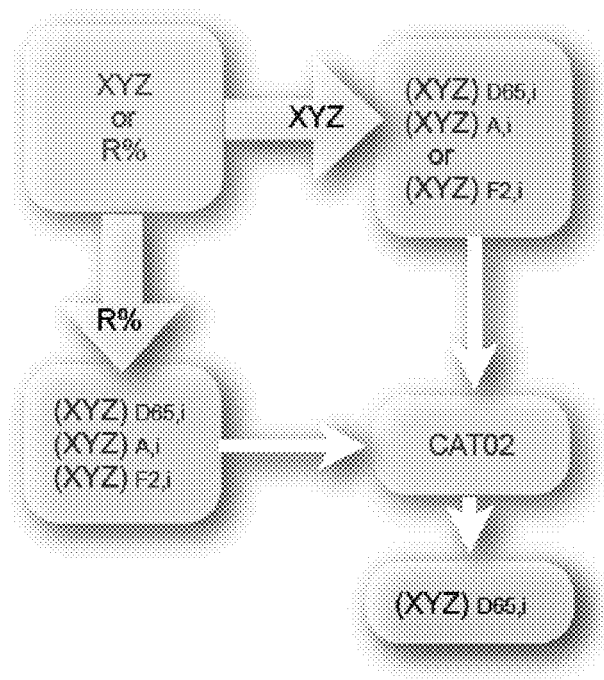

FIG. 19

COLOR SELECTON SYSTEM BASED ON DESIRED COLOR EMOTION AND COLOR HARMONY

BACKGROUND INFORMATION

The present description relates to a color selection system for assisting the selection and combination of colors.

Color selection tools are used in various sectors, including for example the paint industry, to assist consumers and professional designers in choosing appealing color combinations. The abundance of color choices that are available can make it challenging at times for both untrained consumers and experienced designers to select appealing color combinations, even with the aid of existing color selection tools. Accordingly, there is a need for a color selection system that can assist consumers or other users in reaching confident and satisfying color selection choices.

SUMMARY

Embodiments of color selection and display methods and devices are described herein. According to one example embodiment there is provided a computer implemented color selection method, that includes receiving user input identifying a user chosen color; receiving user input identifying a desired first color perception threshold for a first human psychophysical perception of a color combination; selecting, in dependence on a first mathematical model that models the first human psychophysical perception, which colors in a group of known colors will achieve the desired first color perception threshold when combined with the user chosen color; and providing an output for the user identifying the selected colors.

According to another example embodiment there is provided a computer implemented method for providing feedback on color selections, including: providing on a display a visual user interface that includes a plurality of user selectable color elements each representing different colors that are numerically defined in a color library; receiving user input selecting at least one of the color elements as a color candidate element; receiving an input from a color measuring device color information representing a further color candidate element; calculating, using a first mathematical model, a first human psychophysical perception value that represents a first human psychophysical perception of the color combination represented by the color candidate elements; and presenting in the visual user interface a representation of the first human psychophysical perception value.

According to another example embodiment there is provided a computer implemented method for providing feedback on color selections, including: providing on a display a visual user interface that includes a plurality of user selectable color elements each representing different colors that are numerically defined in a color library; receiving user input selecting at least two of the color elements as color candidate elements; calculating, using a first mathematical model, a first human psychophysical perception value that represents a first human psychophysical perception of the color combination represented by the color candidate elements; presenting in the visual user interface a representation of the first human psychophysical perception value; receiving a further user input indicating a different perceptual attribute for viewing colors and re-calculating the first human psychophysical perception value in dependence on the different perceptual attribute; and presenting in the visual user interface a representation of the re-calculated first human psychophysical perception value.

BRIEF DESCRIPTION OF THE DRAWINGS

Embodiments will now be described, by way of example only, with reference to the attached Figures, wherein:

FIG. 4 is a table illustrating color elements used in testing to develop color harmony and color emotion models;

FIGS. 8A-8D illustrate data used to represent color groups in a color library;

FIG. 19 illustrates a dynamic link library routine.

Like reference numerals are used throughout the Figures to denote similar elements and features.

DETAILED DESCRIPTION

Figure 1:
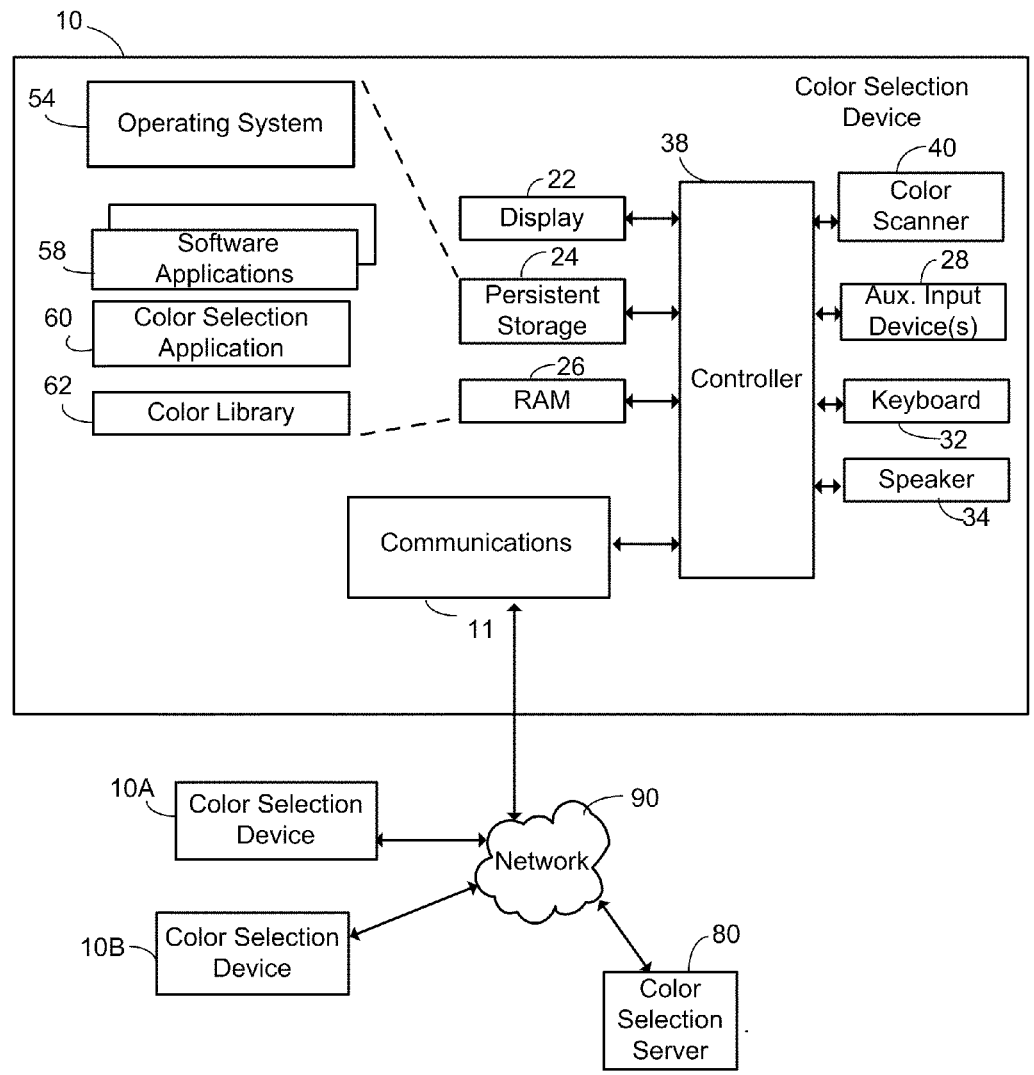
FIG. 1 is a block diagram of a color selection device to which embodiments described herein can be applied.

Example embodiments of the present invention relate to a color selection system for assisting consumers and designers to search desired colors and develop color schemes that can evoke specific emotions and create harmony. FIG. 1 shows a block diagram of an example of a color selection device 10 to which example embodiments of the described invention may be applied. In at least some example embodiments, the device 10 can be implemented by a suitably configured digital computing device, including for example a personal computer such as a desktop computer or lap top computer, or a mobile computing device such as a personal digital assistant, smart phone, or other small size or hand held computing device.

In at least one example embodiment, the device 10 includes a communication subsystem 11 for two-way communications with a network 90. The device 10 includes a controller 38 that can include one or more microprocessors that control the overall operation of the device. The controller 38 interacts with communications subsystem 11 and also interacts with further device subsystems such as a display 22, persistent storage 24, random access memory (RAM) 26, keyboard or keypad 32, speaker 34, auxiliary input device 28 (for example a mouse, touch screen, scroll-ball, scroll-wheel, multi-directional navigation key, touchpad, microphone, and/or other user input devices) and other device subsystems. In at least some example embodiments, the controller 38 also interacts with a color scanner subsystem 40 that permits a user of the device 10 to input color data. In some embodiments, the color selection device 10 is configured to communicate with a color selection server 80 through a network 90. The network 90 can in various embodiments include, among other things, a wide area network such as the Internet, a direct connection, a local area network (LAN), a wireless communication link, and any combinations thereof.

Operating system software 54 and various software applications 58 used by the controller 38 are stored in the persistent storage 24 (which for example may include a hard drive or flash memory or other persistent store). In example embodiments, a color selection software application 60 is stored in the persistent storage 24 for configuring the controller 38 and device 10 to perform the color display and selection functions described below. A color library 62 which contains color data is also stored in the persistent storage 24. Parts or all of the color selection application 60, the color library 62, the operating system 54, and specific device applications 58 may be temporarily loaded into a volatile store such as RAM 26 and executed by the controller 38.

The color selection application 60 and supporting color library 62 may, for example, be loaded onto the device 10 from a physical medium such as a floppy disk or flash drive, or be loaded onto the device 10 from through the network 90 (for example from server 90). In some example embodiments, the color selection application 60 configures device 10 to periodically contact the color selection server 80 (which may for example be associated with a predetermined IP address) for available updates either to the color selection application 60 or the supporting color library 62 and upon receiving user confirmation download available updates. In example embodiments, CIELAB color data is stored in or derived from color library 62 for use in psychophysical perception models as described below. In at least some example embodiments such CIELAB data represents values that correspond to colors viewed under an D65 illuminant at the standard observer angle of 10 degrees.

In at least some example embodiments, the display 22 of the device 10 includes a calibrated display screen that has been preconfigured and tested to display colors within strict tolerances to represent actual colors as viewed under predefined lighting conditions. For example, such a calibrated display 22 could be provided on a color selection device 10 located at a retail outlet such as a paint store, and the device 10 could be part of a wider network that includes a plurality of color selections devices 10, 10A, 10B etc. that are located in a plurality of retail outlets and connected through network 90 to receive periodic updates from and exchange information with color selection server 80. In some embodiments color selection device 10 may be device owned and operated by an interior designer or a typical consumer, without a specially calibrated screen.

In some example embodiments, the color selection application 60 and the color library 62 may not be permanently stored at or executed on the actual device 10 at which the resulting color selection information is displayed. For example, the color selection application 60 and color library 62 can in some embodiments be a remote web-based application that is stored at the server 80 and executed on a controller of the server 80, with the resulting color selection information sent over network 90 and displayed at the user color selection device 10. In some example embodiments, some or all of the functionality of and information in the color selection application 60 and the color library 62 may be distributed among multiple computing devices—for example some of the functions may be carried out at a local user color selection device 10 and some carried out at the remote color selection server 80. In some example embodiments, information about at least some of the users of the system may be stored at the color selection server 80 such as color preferences based on previous colors viewed and previous colors purchased, for example.

Figure 2:
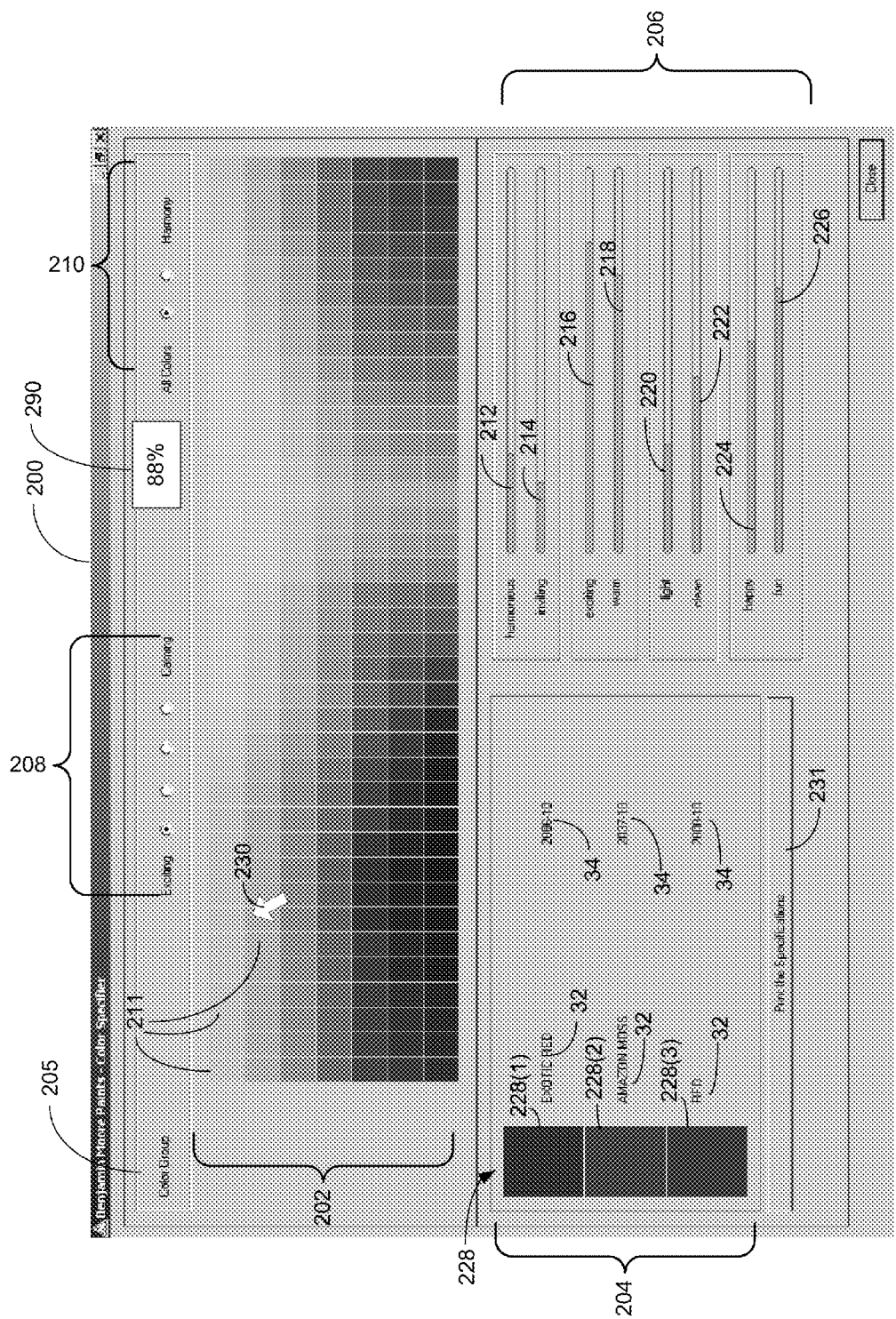
FIG. 2 shows an example of a first graphical user interface that can be used with the mobile electronic device of FIG. 1.

Having provided an overview of example environments in which the color selection system can be implemented, the operation of the color selection system in the context of a color selection application 60 and color library 62 stored on a color selection device 10 as shown in FIG. 1 will now be discussed in greater detail. In this regard, FIG. 2 shows an example of a color selection visual graphical user interface 200 which may be displayed on a display 22 of the device 10. The visual interface 200 includes first and second color display regions 202 and 204. The first color display region 202 displays a color palette or group of user selectable colors as an array of color elements 211 which each represent a unique color. In one example embodiment, the color elements 211 are presented as an electronic version of a fan deck in which the colors samples are arranged vertically by color depth (increases from top to bottom—as color depth increases, chroma changes and lightness drops) and horizontally by hue angle, although other schemes can alternatively be used to arrange the color elements 211, and the samples need not be displayed in an array format—for example the color elements 211 in the color group display region 202 could alternatively be arranged in a color wheel or using some other color presentation method.

The visual interface 200 includes a navigation and selection marker 230 that is moved on display 22 in response to user inputs through user input devices 28 and/or keyboard 62 to facilitate user selection of color elements 211 and allow the user to select and use the various features of the visual interface 200.

In one example embodiment, different color groups can selectively be displayed in the color group display region 202 and interface 200 includes a "color group" tool bar 205 that allows a user to select which color group is displayed. In the illustrated embodiment, the color group tool bar permits a user to select a color group for display region 202 in dependence on (i) an emotional response that the colors evoke ("color emotion") and (ii) a level of color harmony for the colors. With respect to color emotion, the color group tool bar 205 includes a primary group selection option in the form of an "Exciting-Calming" scale 208 which has four discrete user selectable levels, each of which is associated with a different color group as will be explained in greater detail below. With respect to color harmony, the color group tool bar 205 includes a secondary group selection option in the form of user selectable "All Colours" or "Harmony" choices 210 which respectively allow the user to either view all color elements 211 for the selected "Exciting-Calming" color group or to only view a subset of the color elements 211 that fall within a predetermined level of harmony, as will be explained in greater detail below.

The second display region 204 in visual interface 200 functions as a working area for color evaluation of user selected color candidates. In one example embodiment, a user can select desired colors from the color elements 211 displayed in the first display region 202 using the marker 230 (for example by double clicking on the desired color element 211, or dragging and dropping the desired color element).

Once a user selects a color element 211 from the color group display region 202, an enlarged corresponding color candidate sample 228 representing the selected color is displayed in the second display region 204. In the illustrated example, three user selected color candidate samples 228(1), 228(2) and 228(3) are shown in the second display region 204, which may also include further information about the selected color elements, including color names 232 and color ID codes 234 for example.

The interface 200 also includes a third display region 206 which includes a number of different bar scales for displaying information to the user about the color harmony of the selected color candidate samples 228 and emotions evoked by the selected color candidate samples. In particular, the illustrated third display region 206 includes a color harmony scale 212, and the following color emotion scales: Inviting-uninviting 214; exciting-calming 216; warm-cool 218; light-dark 220; clean-dirty 222; happy-depressing 224; and fun-serious 226. In the illustrated version of interface 200, only the first word in each of the color emotion scales is displayed. Fewer, additional, or different harmony and/or color emotion scales can be included in feedback region 206 in different embodiments. In some embodiments, the color harmony scale may be omitted, and in some embodiments the color emotion scales may be omitted.

As will be appreciated from the above description, the visual interface 200 relies on color harmony and color emotion scores to display color groups or provide feedback on selected colors. In example embodiments, the color harmony and color emotion scores used to render the visual interface 200 are determined in dependence on quantitative mathematical models derived from psychometric data obtained from actual test subjects based on their psychophysical reactions to colors. In order to facilitate a further understanding of the color selection system presented herein, an explanation of the color library 62 and the quantitative models used to determine the color harmony and color emotion scores will now be provided.

Color Harmony and Color Emotion Models

In order to provide some background for the color harmony and color emotion models, reference is made to following four documents which describe examples of color harmony and color emotion models and how such models are derived. The following references are incorporated herein by reference:
(1) Ou, L., Luo, M. R., Woodcock, A., and Wright, A., "A study of colour emotion and colour preference, Part. I: colour emotions for single colours", Color Research and Application, Volume 29, number 3, pages 232-240, June 2004.
(2) Ou, L., Luo, M. R., Woodcock, A., and Wright, A., "A study of colour emotion and colour preference, Part II: colour emotions for two-colour combinations", Color Research and Application, Volume 29, Number 4, pages 292-298, August 2004.
(3) Ou, L., Luo, M. R., Woodcock, A., and Wright, A., "A study of colour emotion and colour preference, Part III: colour preference modelling", Color Research and Application, Volume 29, Number 5, Pages 381-389, October 2004.
(4) Ou, L., Luo, M. R., "A colour harmony model for two-colour combinations", Color Research and Application, Volume 31, Number 3, pages 191-204, June 2006.

A further reference that in incorporated herein by reference is: (5) N. Moroney, M. Fairchild, R. Hunt, R. Luo and T. Neuman, "The CIECAM02 Color Appearance Model", IS&T/SID Tenth Color Imaging Conference, Nov. 12, 2002, ISBN:0-89208-241-0.

Figure 3:
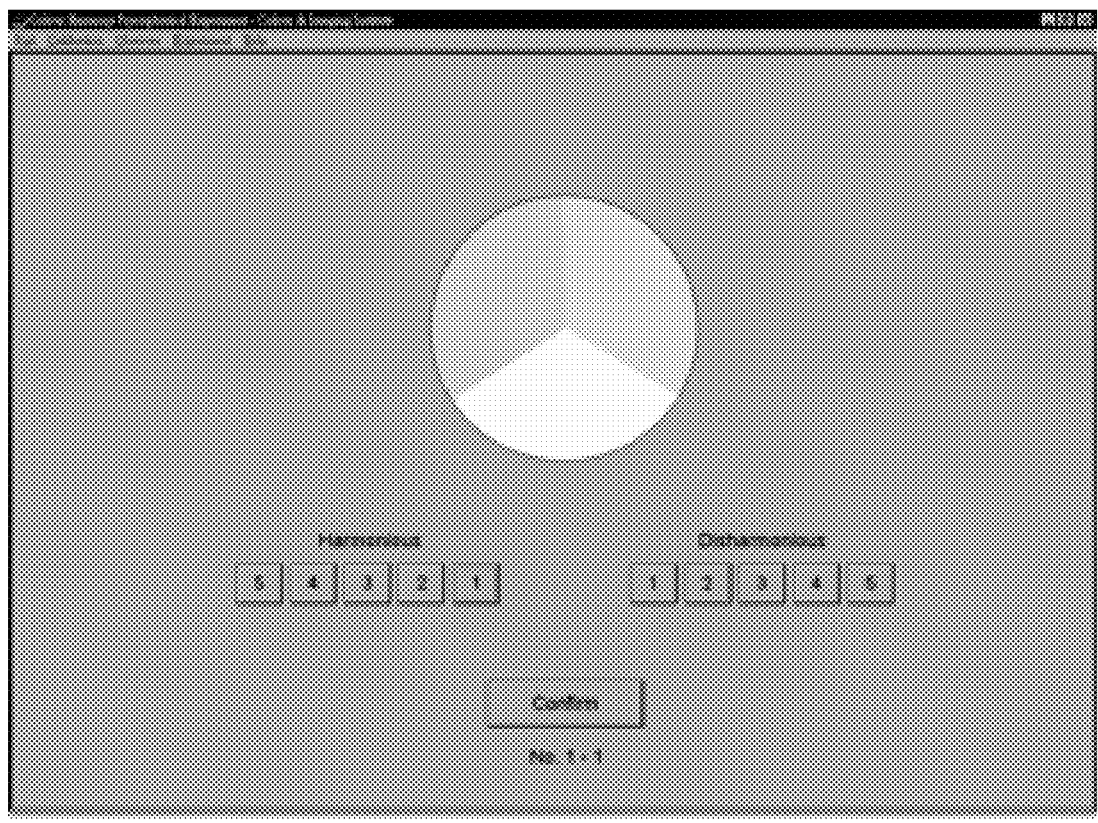
FIG. 3 shows an example of an image showing a three color wheel used in testing for developing a color harmony model.

In one example embodiment, the models used in the color selection system according to example embodiments of the present invention model human psychophysical perceptions of colors and color combinations and were developed using data obtained from test subjects who were presented with single colors and combinations of up to three colors and requested to assess the colors by making a categorical judgements using bi-polar color emotion scales and color harmony scales. By way of example, in order to develop a model for color harmony for 3-color combinations, a psychophysical perception experiment was conducted to have test subjects assess 6545 three-color wheels that included all possible three color combinations generated from 35 different color elements (see Table 1 of FIG. 4) that were each selected from the CIELAB color space, with illuminant D65 and standard observer (10 degrees). The 35 different color elements were selected to cover a large color gamut of the CIELAB color space. FIG. 3 illustrates a screen layout for the experiment in which each observer was presented with color wheels displayed individually on a calibrated CRT monitor in a darkened room. Each observer assessed the degree of harmony for each color wheel using a 10-category scale ranging from "extremely harmonious" to "extremely disharmonious" after being advised that harmonious means "forming a pleasing or consistent whole" and disharmonious means "lack of harmony". Torgerson's Law of Categorical Judgement [Torgerson, W. S., "Theory and Methods of Scaling", John Wiley & Sons, New York, 1958] was used to transform the experimental data onto an interval scale. The resulting scale values are called colour harmony scores, indicating the degree of harmony for each colour wheel; the higher the score, the more harmonious the colour wheel appeared to the observers. Based on the results of such testing the color harmony model discussed below was developed.

Figure 5:
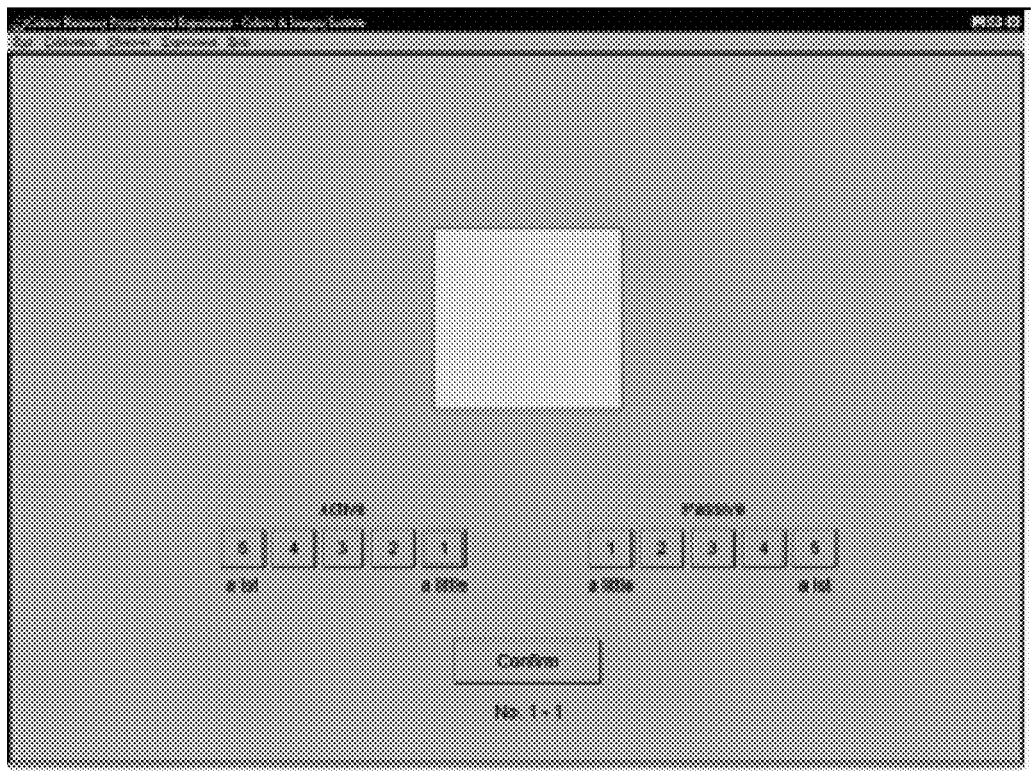
FIG. 5 shows an example of an image showing a single color patch used in testing for developing a human response model.
Figure 6:
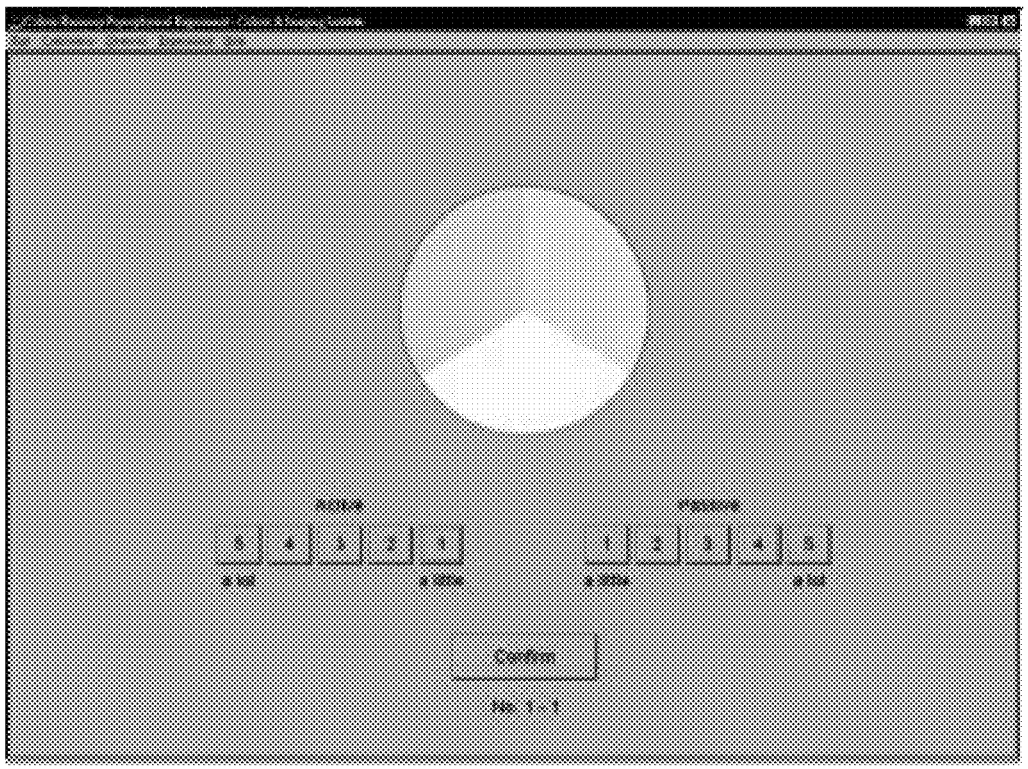
FIG. 6 shows an example of an image showing a three color wheel used in testing for developing a human response model.

Similar testing was performed to develop models for each of the seven color emotions scales 212-226 discussed above. For example, for developing color emotion models, a psychophysical experiment was carried out using 35 single color patches (using the colors shown in table 1 of FIG. 4) and 90 three-color wheels as stimuli. FIGS. 5 and 6 respectively show examples of a single color patch and a three color wheel presented to a test subject on a calibrated CRT monitor in a darkened room. Each observer assessed the degree of color emotion for each color patch and each color wheel using a 10-category scale for each of the seven color emotion scales after being advised of the following dictionary meanings associated with each of the scales:
  (1) Exciting-Calming:
    exciting: causing great enthusiasm and eagerness
    calming: making (someone) tranquil and quiet
  (2) Inviting-Uninviting:
    inviting: offering the promise of an attractive or enjoyable experience
    uninviting: unappealing; unattractive
  (3) Warm-Cool:
    warm: of or at a fairly or comfortably high temperature
    cool: of or at a fairly low temperature
  (4) Light-Dark:
    light: having a considerable or sufficient amount of natural light
    dark: with little or no light
  (5) Clean-Dirty:
    clean: free from dirt, marks, or stains
    dirty: covered or marked with an unclean substance (6) Happy-Depressing:
happy: feeling or showing pleasure or contentment
depressing: causing or resulting in a feeling of miserable dejection
(7) Fun-Serious:
fun: amusing, entertaining, or enjoyable
serious: acting or speaking sincerely and in earnest, rather than in a joking or halfhearted manner Based on assessments provided by the test participants, the following psychophysical perception models have been developed and are used in example embodiments of the present invention to determine color emotion scores:

(1) Exciting-Calming:
For a single color, the model used for determining a psychophysical perception color emotion score on the "Exciting-Calming" scale is:

$$\text{Exciting} = -1.13 + 0.02\left[(L^* - 40)^2 + \left(\frac{a^*}{0.37}\right)^2 + \left(\frac{b^*}{0.60}\right)^2\right]^{\frac{1}{2}} \quad \text{Equation (1)}$$

where L*, a* and b* represent the three CIELAB coordinates for the color considered. As known in the art, the three parameters L*, a* and b* in the CIELAB model represent the three dimensions of a color space as follows: L*—the lightness coordinate indicating the lightness level of the color; a*—the red/green coordinate, with +a* indicating red, and −a* indicating green; and b* the yellow blue/coordinate, with +b* indicating yellow, and −b* indicating blue. CIELAB model is further described in the CIE (commission internationale de l'éclairage) publication "Colorimetry", 3$^{rd}$ Edition, Publication CIE 15:2004, ISBN 3 901 906 339.

(2) Inviting-Uninviting:
For a single color, the model used for determining a human psychophysical perception color emotion score on the "Inviting-uninviting" scale is:

$$\text{Inviting} = -1.6 + 0.009\left[(L^* - 13)^2 + \left(\frac{a^* - 3}{0.19}\right)^2 + \left(\frac{b^* - 19}{0.29}\right)^2\right]^{\frac{1}{2}} + 0.015L^* \quad \text{Equation (2)}$$

where L*, a* and b* represent the three CIELAB coordinates for the color considered.

(3) Warm-Cool:
For a single color, the model used for determining a human psychophysical perception color emotion score on the "Warm-Cool" scale is:

$$\text{Warm} = 0.02 + 0.12(C^*_{ab})^{0.6} \cos(h_{ab} - 45°) - (1.5 \times 10^{-8})(L^*)^{3.9} \quad \text{Equation (3)}$$

where $C^*_{ab}$, $h_{ab}$ and L* represent CIELAB chroma, hue angle and lightness for the color considered.

(4) Light-Dark:
For a single color, the model used for determining a human psychophysical perception color emotion score on the "Light-Dark" scale is:

$$\text{Dark} = -2.1 + 0.05(100 - L^*) \quad \text{Equation (4)}$$

where L* represents the CIELAB lightness value for the color considered.

(5) Clean-Dirty:
For a single color, the model used for determining a human psychophysical perception color emotion score on the "clean-dirty" scale is:

$$\text{Clean} = -1.8 + 0.043\left[(L^* - 28)^2 + \left(\frac{a^* - 3}{1.18}\right)^2 + \left(\frac{b^* - 27}{1.27}\right)^2\right]^{\frac{1}{2}} \quad \text{Equation (5)}$$

where L*, a* and b* represent the three CIELAB coordinates for the color considered.

(6) Happy-Depressing:
For a single color, the model used for determining a human psychophysical perception color emotion score on the "happy-depressing" scale is:

$$\text{Happy} = -1.3 + 0.025\left[(L^* - 14)^2 + \left(\frac{a^*}{0.73}\right)^2 + \left(\frac{b^* - 12}{0.85}\right)^2\right]^{\frac{1}{2}} \quad \text{Equation (6)}$$

where L*, a* and b* represent the three CIELAB coordinates for the color considered.

(7) Fun-Serious:
For a single color, the model used for determining a human psychophysical perception color emotion score on the "Fun-Serious" scale is:

$$\text{Fun} = -1.8 + 0.027\left[(L^* - 10)^2\left(\frac{a^*}{0.45}\right)^2 + \left(\frac{b^* - 10}{0.61}\right)^2\right]^{\frac{1}{2}} \quad \text{Equation (7)}$$

where L*, a* and b* represent the three CIELAB coordinates for the color considered.

Color Emotion Scores for Color Combinations

For modeling color emotion scores for two and three color combinations on six of the seven color emotion scales noted above (excluding the "inviting-uninviting" scale), an additivity property is employed in that the color emotion scores are calculated individually using the above models for each of the colors in the combination, and then averaged to determine a color emotion score for the combination. In particular, for a two color combination the color emotion score for the two color combination can be determined as follows:

$$E = (E1 + E2)/2 \quad \text{Equation (8)}$$

where E stands for a color emotion score for the two-color combination; and E1 and E2 represent color emotion scores of the two constituent colors in that combination.

Similarly, for a three color combination the color emotion score for the two color combination can be determined as follows:

$$E = (E1 + E2 + E3)/3 \quad \text{Equation (9)}$$

where E stands for a color emotion score for the two-color combination; and E1 to E3 represent color emotion scores of the constituent colors in that combination.

Thus, the color emotion score in the exciting scale for a combination of two or three colors can be determined by averaging the "exciting-calming" color emotion scores determined individually for each of the constituent colors in that combination. The color emotion scores for color combinations on each of the other color emotion scales (excluding the "inviting-uninviting" scale) can similarly be determined. It is projected that in at least some embodiments, color emotion scores for combinations of greater than three colors can be assigned by using similar averaging methods such that the color emotion score for a color combination can be determined by averaging all the emotion scores of all the colors in the combination.

Figure 7:
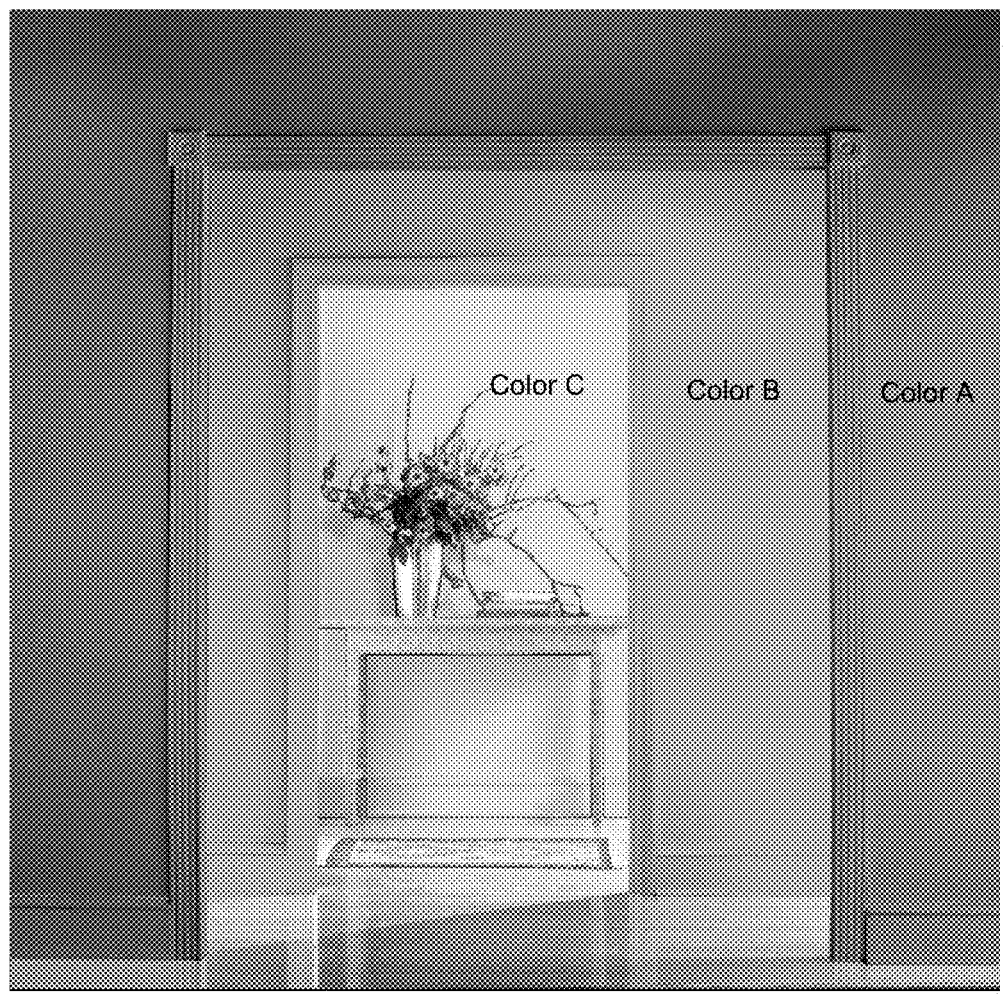
FIG. 7 shows an example of an image illustrating adjacent and non adjacent colors.

Color Emotion Scores for Color Combinations Using the "Inviting-Uninviting" Scale Although in some example embodiments straight averaging of the individual color "inviting-uninviting" scale color emotion scores can be used to determine an approximate "inviting-uninviting" scale score for the combination, test results have indicated that the correlation between modeled results and actual measured test results for color combinations using averaging is not as accurate for the "inviting-uninviting" scale as it is for the other six color emotion scores. Accordingly, in at least some example embodiments, a different model is used for determining color emotion scores for color combinations on the "inviting-uninviting", and a distinction is made between adjacent and non adjacent colors, and in this regard reference is made to FIG. 7 which illustrates a three color combination including Color A, Color B, and Color C. Color B is adjacent to both Color A and Color C. As Color C and Color A are separated from each other, they are non-adjacent.

The "inviting-uninviting" combined color model consists of two parts, one (Inviting$_A$) dealing with adjacent colors and the other (Inviting$_N$) nonadjacent colors, as shown in Equations (10) and (11), respectively.

For adjacent colours:

$$\text{Inviting}_A = -0.15 + 0.14 I_C + 0.89 I_{Lsum} + 0.74 I_{\Delta L} + 0.51 I_H \quad \text{Equation (10)}$$

where $I_C = 0.6 \tan h(1.8 - 0.05 \Delta C_1)$ $\Delta C_1 = [(\Delta H^*_{ab})^2 + (\Delta C^*_{ab}/0.84)^2]^{1/2}$ $I_{Lsum} = -1.2 + 0.012 L_{sum}$ in which $L_{sum} = L^*_1 + L^*_2$ $I_{\Delta L} = 0.15 + 0.16 \tan h(-2 + 0.19 \Delta L)$ in which $\Delta L = |L^*_1 - L^*_2|$ $I_H = I_{SY1} + I_{SY2}$ $I_{SY} = E_C(I_S + E_Y)$ $E_C = 0.5 + 0.5 \tan h(-2 + 0.5 C^*_{ab})$ $I_S = -0.08 - 0.14 \sin(h_{ab} + 50°) - 0.07 \sin(2h_{ab} + 90°)$ $E_Y = [(0.22 L^* - 12.8)/10] \exp\{(90° - h_{ab})/10 - \exp[(90° - h_{ab})/10]\}$ where $L^*$, $C^*_{ab}$ and $h_{ab}$ stand for values of lightness, chroma and hue angle in CIELAB system, respectively (with subscripts 1 and 2 each used in the above variables to denote scores associated with the first and second colors respectively in the two color combination).

For nonadjacent colours:

$$\text{Inviting}_N = -0.16 + 0.41 I_C \quad \text{Equation (11)}$$

The model for determining the "inviting-uninviting" color emotion score for colour combinations considering both adjacent and nonadjacent colors is:

$$\text{Inviting} = \frac{1}{n}\left[\sum (\text{Inviting}_A) + \sum (\text{Inviting}_N)\right] \quad \text{Equation (12)}$$

Color Harmony Models:

With respect to color harmony, based on the assessments provided by the test subjects, the following models have been developed and are used in example embodiments of the present invention to determine color harmony scores for color combinations. Again, in at least some example embodiments a differentiation is made between adjacent colors and non adjacent colors in color combinations, and thus the color harmony includes two parts, namely $CH_A$ for assigning a color harmony score for a pair of adjacent colors in a color combination (see Equation 13 below), and $CH_N$ for assigning a color harmony score for a pair on non-adjacent colors in a color combination (see Equation 14 below). Once color harmony scores for all color pairs within a color combination are determined, the scores are averaged as indicated below to determine a color harmony score for the entire combination (see Equation 15 below).

In example embodiments, color harmony ($CH_A$) for two adjacent colors is determined using the following equation:

$$CH_A = H_C + H_L + H_H \quad \text{Equation (13)}$$

in which $H_C = 0.04 + 0.53 \tan h(0.8 - 0.045 \Delta C)$ $\Delta C = [(\Delta H^*_{ab})^2 + (\Delta C^*_{ab}/1.46)^2]^{1/2}$ $H_L = H_{Lsum} + H_{\Delta L}$ $H_{Lsum} = 0.3 + 0.5 \tan h(-4 + 0.029 L_{sum})$ in which $L_{sum} = L^*_1 + L^*_2$ $H_{\Delta L} = 0.14 + 0.15 \tan h(-2 + 0.2 \Delta L)$ in which $\Delta L = |L^*_1 - L^*_2|$ $H_H = H_{SY1} + H_{SY2}$ $H_{SY} = E_C(H_S + E_Y)$ $E_C = 0.5 + 0.5 \tan h(-2 + 0.5 C^*_{ab})$ $H_S = -0.08 - 0.14 \sin(h_{ab} + 50°) - 0.07 \sin(2h_{ab} + 90°)$ $E_Y = [(0.22 L^* - 12.8)/10] \exp\{(90° - h_{ab})/10 - \exp[(90° - h_{ab})/10]\}$ where $\Delta H^*_{ab}$ and $\Delta C^*_{ab}$ represent CIELAB colour difference in hue and chroma, respectively; $L^*$, $C^*_{ab}$ and $h_{ab}$ represent CIELAB lightness, chroma and hue angle, respectively (with subscripts 1 and 2 each used in the above variables to denote scores associated with the first and second colors respectively in the two color combination).

In example embodiments, for two non-adjacent colors, a color harmony value $CH_N$ is determined using the following equation:

$$CH_N = H_{C,N} \quad \text{Equation (14)}$$

in which:

$H_{C,N} = 0.2 + 0.65 \tan h(1.7 - 0.045 \Delta C_N)$ $\Delta C_N = [(\Delta H^*_{ab})^2 + (\Delta C^*_{ab}/1.30)^2]^{1/2}$ where $\Delta H^*_{ab}$ and $\Delta C^*_{ab}$ are CIELAB colour difference values between the non-adjacent colors in hue and in chroma, respectively.

The color harmony values for the entire color combination can then be determined by averaging the CH scores for all color pairs (both adjacent and non-adjacent) as follows:

$$CH = \frac{1}{n}\left[\sum (CH_A) + \sum (CH_N)\right] \quad \text{Equation (15)}$$

where n is the total number of color pairs in a colour combination; and $CH_A$ and $CH_N$ are harmony scores for adjacent and nonadjacent colors, respectively.

Equation (13) for determining color harmony for two adjacent colors incorporates the following assumptions:
(a) Equal-hue and equal-chroma. Any two adjacent colors varying only in lightness tend to appear harmonious when combined together.
(b) High lightness. The higher the lightness value of each constituent colour in an adjacent color pair, the more likely it is that this pair will appear harmonious.
(c) Unequal lightness values. Small lightness variations (i.e. less than around 15 units of CIELAB colour difference) between the constituent colors in an adjacent colour pair may reduce the harmony of that pair.
(d) Hue effect. Among various hues, blue is the one most likely to create harmony in a two colour combination; red is the least likely to do so. In addition, bright yellows more often create harmony in an adjacent two-color combination than dark yellows. (e.g. khaki colors).

On the other hand, of the four color harmony principles described in the previous paragraph, only "(a) the equal-hue and equal-chroma principle" was found to play a significant role in the harmony of non-adjacent colors, which is incorporated into equation (14).

In alternative embodiments, color emotion scores and color harmony scores can be modeled using equations other than those discussed above, which are provided as one example of how human responses to colors can be modeled. For example, it will be noted that each of the above equations includes constants—in some embodiments the values used for the constants can vary from those stated above. For example, in at least some configurations for each of the models other than the "warm-cool" model, the constants in the above equations can vary from 50% to 150% of the values stated above. In at least some configurations for the "warm-cool" model, the constants in the above equations can vary from 50% to 110% of the values stated above. In other embodiments, different psychophysical perception models can be employed other than or in addition to those set out above.

As noted above, the models used to implement the color selection methods and devices described herein model human psychophysical perceptions of color emotion for colors and color combinations. Color harmony applies to a combination of colors, while the seven color emotions described above can apply to both individual colors and combinations of colors. In this regard, as used herein human psychophysical perception refers to a response of a human to a color or color combinations, as opposed to a more basic sensory perception such as a basic color perception. By way of example, perceiving that a color is "warm" or a color combination is "harmonious" is a reaction or feeling and hence a human psychophysical perception, whereas perceiving that a color is "green", or has a particular "hue" or "chroma" is a more basic sensory perception. By using mathematical models of human psychophysical perceptions that are based on response data gathered from a plurality of test subjects, the embodiments described herein simulate typical human reactions to colors and combinations of colors and use that information to assist users with color selection. Thus, in example embodiments the color selection methods and devices described herein can provide a virtual second opinion to the user's own feelings or color emotions, which may improve the user's color selection confidence especially in environments where users can be inundated with multiple colors in a short time period. Furthermore, in example embodiments the color selection methods and devices described herein can be used to filter the number of possible color selections presented to user and thereby reduce confusion at being presented with a myriad of color choices.

Color Library

The color library used in example embodiments of the invention will now be discussed in greater detail. In one example embodiment, the color library 62 is divided up into four different color groups (E1, E2, E3, E4) using the results of exciting calming equation (1). Each color group which is associated with one of the four possible positions on the "Exciting-Calming" color scale 208 presented in the color group toolbar 205 of visual interface 200. In this regard Table 2 of FIG. 8A represents a portion of a color library file 62-1 for a group of colors (Color Group E1) that is associated with the left most button on "Exciting-Calming" color scale 208. As shown in FIG. 8A, the color library file 62-1 includes for each listed color: (a) a unique color code (in the column labelled "code"); (b) a color name; (c) the CIELAB Values for the color, including the three CIELAB coordinates for the color (L* (lightness), a* and b*), as well as CIELAB values $C^*_{ab}$ (chroma) and $h_{ab}$ (hue angle). As well, an exciting-calming color emotion value E calculated using equation (1) is shown for each color in FIG. 8A, although that information could be omitted from the library file as it can be determined from the CIELAB values. Turning briefly again to FIG. 2, in the illustrated embodiment the color elements 211 displayed in the color group display region 202 are arranged in rows and columns—in at least one example embodiment, the color library file 62-1 includes information for each color identifying the location of that color in the array of color elements 211 (represented in FIG. 8A by the left-most column labelled "Row-Column"). In the illustrated embodiment, the each column represents a color page or paint strip that includes multiple colors arranged by color depth, and the colors included in each column have been manually selected. When classifying the library into color groups, the mean "exciting-calming" score for each color page or column is calculated, and the color columns are then assigned to a respective color group based on the mean "exciting-calming" score.

FIGS. 8B, 8C and 8D each show portions of respective color library files 62-2, 62-3 and 62-3, each of which represents a different group of colors falling within a unique range on the exciting-calming color emotion scale. Accordingly, color group E1 (library file 62-1) represents "very exciting" colors (in one illustrative example, group E1 includes 259 colors having a mean "exciting-calming" value of 0.78); color group E2 (library file 62-2) represents "slightly exciting" colors (in one illustrative example, group E2 includes 273 colors having a mean "exciting-calming" value of 0.15); color group E3 (library file 62-3) represents "slightly calming" colors (in one illustrative example, group E3 includes 249 colors having a mean "exciting-calming" value of −0.21); and color group E4 (library file 62-4) represents "very calming" colors (in one illustrative example, group E4 includes 189 colors having a mean "exciting-calming" value of −0.50). Although in the illustrated embodiment, the four color groups E1, E2, E3 and E4 are each specified in separate files of color library 62, in other embodiments they could be specified in a single file, and categorized into the respective color groups by the color selector application 60 based on their respective calming-exciting scores (or based on mean calming-exciting scores for sub-groups such as color columns).

Visual Interface

A. Color Group Display Region

Figure 9:
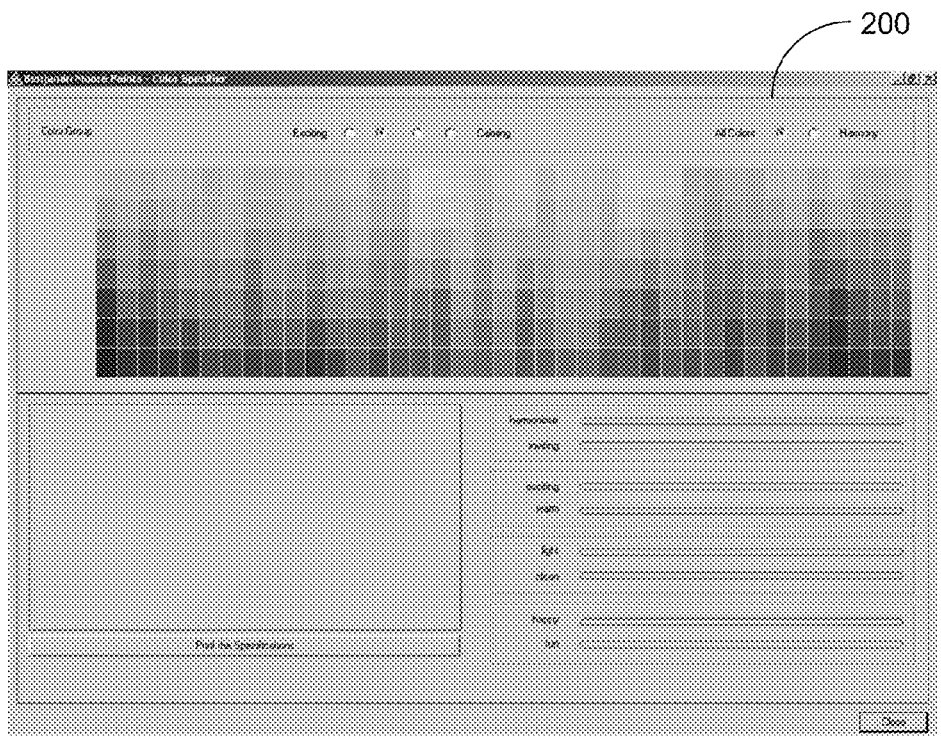
FIGS. 9, 10 and 11 each show the user interface of FIG. 2 displaying different color groups.
Figure 10:
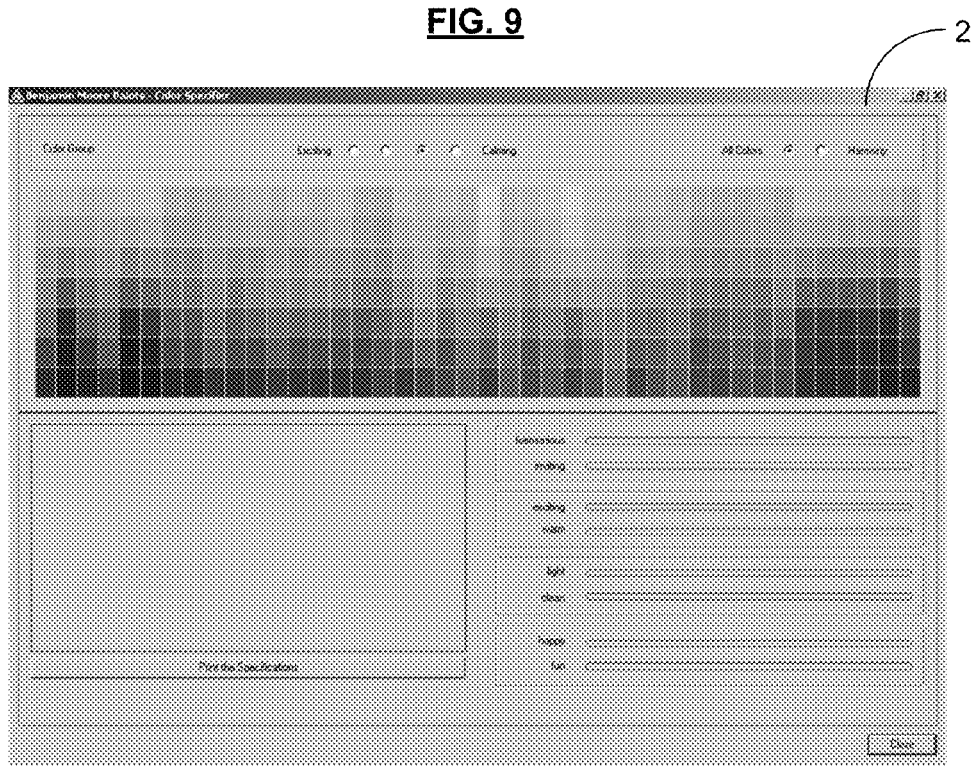
Figure 11:
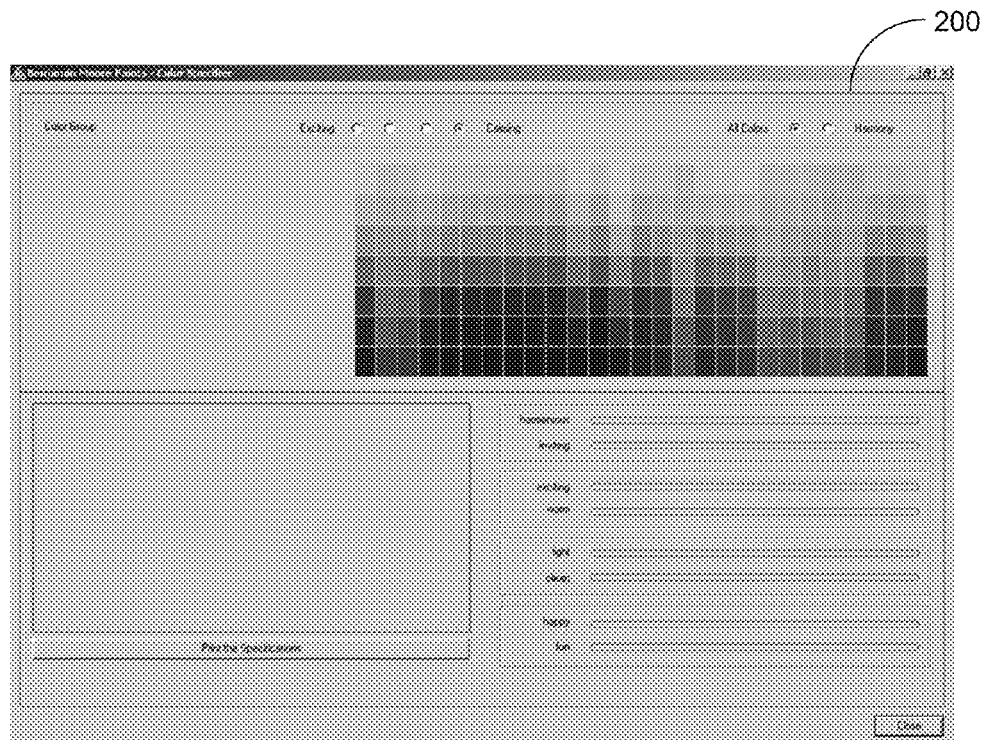

Turning again to the visual interface 200 of FIG. 2, in the illustrated embodiment, when the leftmost button on the "exciting-calming" scale 208 is selected, color elements 211 corresponding to the "very exciting" color group E1 (library file 62-1) are displayed in color group display region 202. When the second button on the "exciting-calming" scale 208 is selected, color elements 211 corresponding to the "slightly exciting" color group E2 (library file 62-2) are displayed in color group display region 202, as shown in FIG. 9. When the third button (i.e. second from the right) on the "exciting-calming" scale 208 is selected, color elements 211 corresponding to the "slightly calming" color group E3 (library file 62-3) are displayed in color group display region 202, as shown in FIG. 10. When the right-most button on the "exciting-calming" scale 208 is selected, color elements 211 corresponding to the "very calming" color group E4 (library file 62-4) are displayed in color group display region 202, as shown in FIG. 11.

Figure 12:
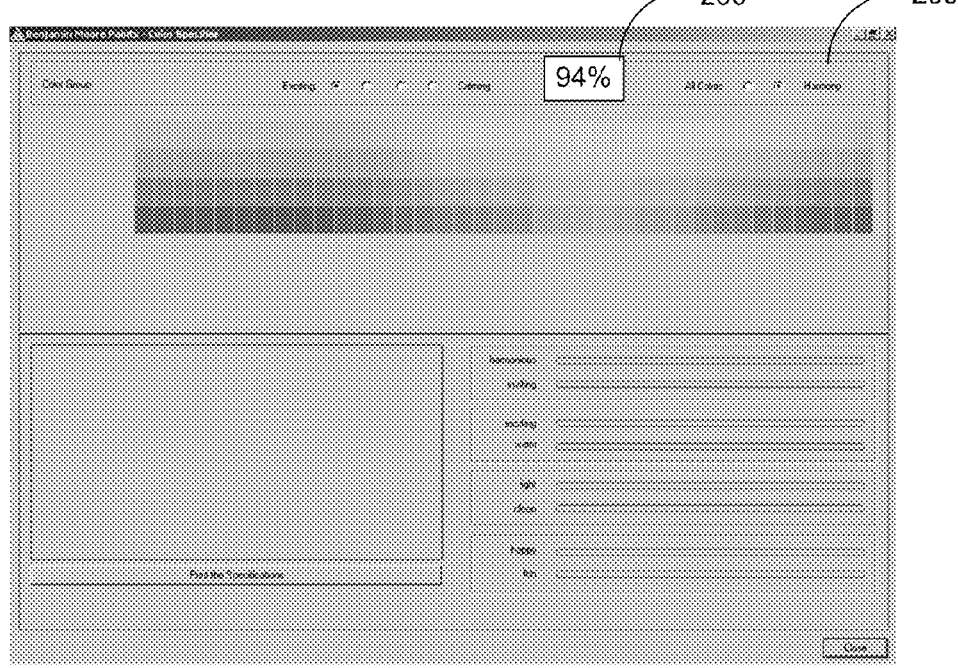
FIG. 12 shows the user interface of FIG. 2 displaying a harmony subgroup of a color group.

As noted previously, the color group displayed in the color group display region 202 can be further limited by selecting the "Harmony" mode option from the "All Colors" and "Harmony" choices 210. In Harmony mode, the colors displayed in the color group display region 202 are limited to the colors from the group that are determined to meet certain harmony thresholds. As apparent from harmony equation (13) above, when determining the harmony between a pair of colors, the "lightness sum" factor (i.e. $H_{Lsum}$) plays an important role in the determination of color harmony scores: the lighter the colors, the more likely it is for them to create harmony. In the illustrated embodiment, the color elements 211 are arranged vertically by color depth, and horizontally by hue. Accordingly, in order to limit the color group to colors that have a high likely hood of being harmonious, in one example embodiment the "darker" colors are dropped from the color group display region 202 in harmony mode. For example, in one embodiment, selecting the harmony button from options 210 results in the interface 200 being modified so that only the top four rows of the selected color group is displayed. FIG. 12 shows an example of the interface 200 in "Harmony" mode displaying the top four rows of color group E1. Similarly, when each of the color groups E2-E4 are respectively displayed in harmony mode, only their top four rows are shown in the color group display area 202.

One possible method for measuring the harmony of a group of colors is to use harmony equation (13) to calculate a harmony score for every possible color pair combination within the group, and then determine the percentage of color pair combinations in the group that have a positive harmony score. By way of illustrative example, using such a group harmony calculation method provides a color harmony score of approximately 88% for color group E1, 80% for color group E2, 77% for color group E3, and 61% for color group E4. When each of the four color groups are limited to their top four rows, the group harmony calculation provides a color harmony score of approximately 94% for color group E1, 97% for color group E2, 99% for color group E3, and 99% for color group E4. Accordingly, in the illustrated embodiment, selecting the harmony mode option from options 210 results in a displayed color group having a color harmony score of at least 94% or higher.

Although only two discrete choices 210 ("All Colors" or "Harmony") are shown in interface 200 of FIG. 2, the two discrete choices in tool bar 205 could be replaced with either a discrete scale with more than two options on the harmony scale, or a continuous sliding harmony scale (similar to scale 212), or a numeric pull down scale that allowed a user to select a desired color harmony level for the color group. Only the colors from the currently selected color group meeting the user selected color harmony level would then be displayed as color elements 211 in color group display area. For example, the user may specify that they only want to see colors from color group E1 having a color harmony score of 90% or higher, which would result in fewer group E1 colors being displayed in region 202 than are shown in FIG. 2, but more than are shown on FIG. 12. As shown in FIG. 2, in the illustrated embodiment, the color group tool bar 205 includes a color group harmony score indicator 290 that displays a representation of the color harmony score for the color group currently displayed in area 202.

Alternative methods can be used to determine a harmony score for a color group. For example, while the above-described color group harmony quantification method merely takes into account the number of positive harmony scores for every possible color pair combination within the color group, a weighted method could be used to take into account the magnitude of positive harmony scores in addition to the number of occurrence of positive harmony scores.

Thus, it will be appreciated that user interface 200 allows a user to filter the color elements 211 displayed in the working group region 202 based on desired levels for color perception characteristics that are inputted by the user (e.g. an exciting calming level and/or a harmony level).

b. Working and Color Information Regions

Turning again to FIG. 2, as noted above users can select color elements 211 from the color group region 202, with selected color elements them being displayed as color candidate samples 228 in the working region 204 of interface 200. Under control of the color selection application 60, the controller 38 calculates color harmony and color emotion scores for the color candidate samples 228 in the working region 204 using the harmony and emotion modelling equations (1)-(15) discussed above. The results graphically are presented on the scales harmonious-unharmonious 212, inviting-uninviting 214, exciting-calming 216, warm-cool 218, light-dark 220, clean-dirty 222, happy-depressing 224, and fun-serious 226 of color information region 206. Although the scales shown in FIG. 2 are each represented as continuous horizontal bars that are filled in to represent the magnitude of the respective color harmony or color emotion score that they represent, the color harmony and color emotion information can be presented in alternative formats in different embodiments. By way of non-limiting example, actual numerical values can be presented, discrete scales can be used rather than continuous scales (for example, a discrete scale could look like scale 208), and/or vertical scales can be used instead of horizontal scales.

Each time the combination of colors candidate samples 228 in the working area 204 changes (for example through addition or removal by a user of a color candidate sample 228), the information displayed on the scales of region 206 is updated to reflect the current color combination. In an example embodiment, when just a single color candidate sample is in working area 204, the harmony scale 212 displays a null value, but the color emotion scales display the respective color emotion scores for the single color.

Figure 13:
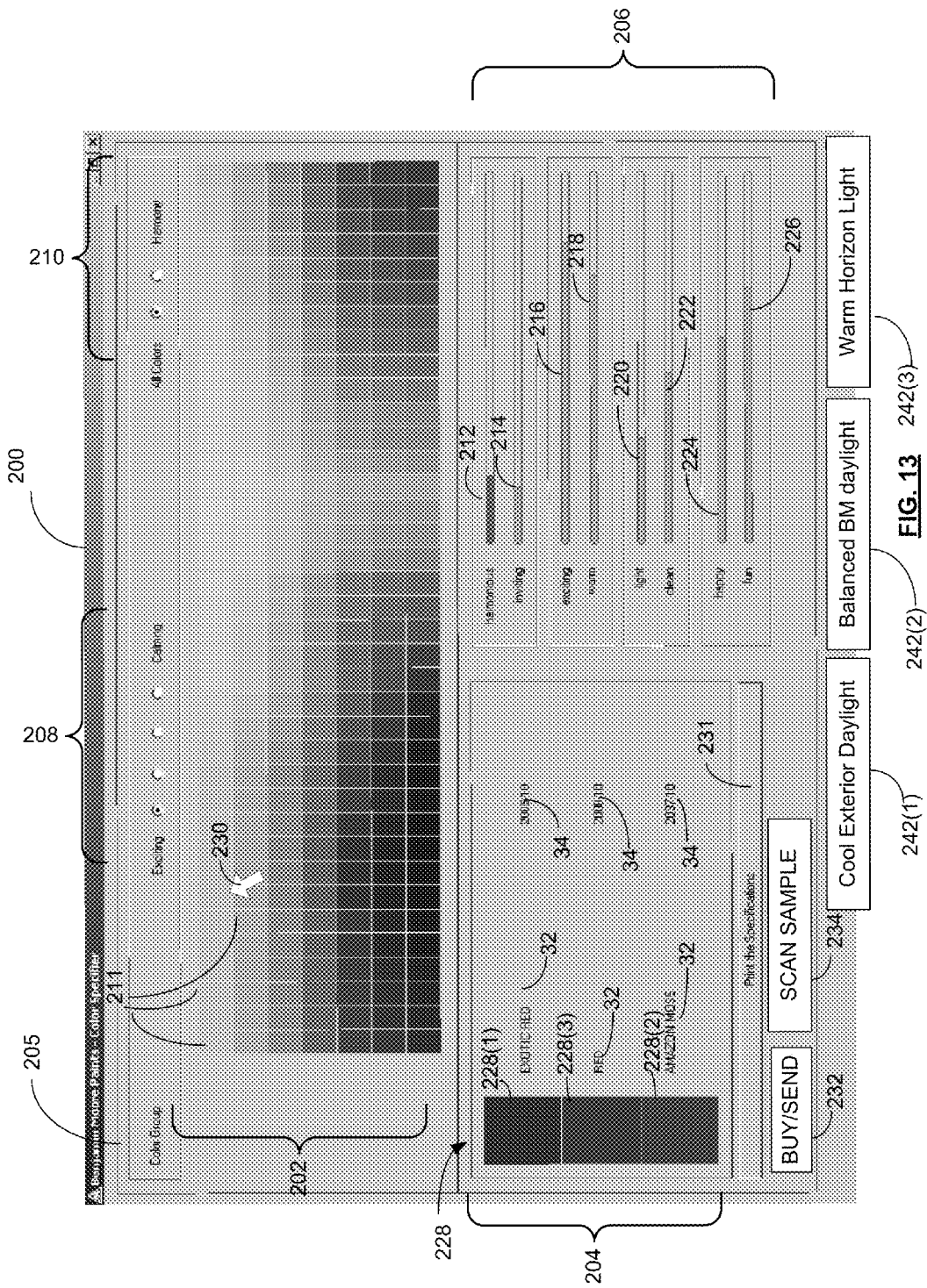
FIG. 13 shows another example of the user interface of FIG. 2.

As noted above, for most of the color emotion models, when multi-color combinations are considered it is not relevant if the candidate colors are adjacent to each other or not. However, at least in the case of the color harmony and the color emotion scale "inviting-uninviting", the scores determined for the color candidate combination are dependent on the relative orientation of the colors candidate samples. Accordingly, in example embodiments the relative positioning of the color candidate samples 228 in the working area 204 is taken into account when calculating the scores for the harmony scale 212 and the color emotion scale "inviting-uninviting" 214. By way of example, in the interface 200 as illustrated in FIG. 2, the color candidate sample 228(2) is adjacent both of the color candidates 228(1) and 228(3) which are non-adjacent each other, and this relative positioning is reflected in the harmony scale 212 and the color emotion scale "inviting-uninviting" 214. FIG. 13 shows interface 200 with the exact same color candidate samples from FIG. 2 in working space 204, however in this case the positions of color candidate samples 228(2) and 228(3) have been reversed, resulting in different scores on the harmony scale 212 and the color emotion scale "inviting-uninviting" 214, while the remaining color emotion scales 216-226 that are not dependant on the relative positioning of the colors stay the same. In example embodiments, a user can reposition the color candidate samples 228 within the working area 228.

In one example embodiment, the color selection device 10 is configured to generate an alert or indicator when selected color combinations in the working area 204 fall below predetermined color harmony threshold, which may be preset, or may be a user configurable value. By way of example, the bar used to represent the harmony scale 212 may change color depending on whether the calculated harmony score is above or below the threshold, with a green bar being used for above threshold color combinations and a red bar being used for below threshold color combinations. FIG. 13 illustrates a combination for which a color harmony alert has been generated in the from of a darker colored bar appearing on the harmony scale 212 than on the other scales (or on the harmony scale 212 shown in FIG. 2 for the same colors in a different order). The harmony alert could take different forms, including for example other or different visual and/or aural stimulation being issued by the color selection device 10. Furthermore, the color selection device 10 can also be configured to provide threshold alerts for all or selected ones of the color emotion scales shown in region 206 in the event that the corresponding color emotion scores fall below threshold levels. In at least some example embodiments, the scales for which alerts are provided and the thresholds for determining an alert are user configurable with default values set by a designer involved in configuration of the color selection application 60.

As indicated in FIG. 13, in one example embodiment, the interface 200 includes a "print" option button 231 that a user can select to print out the color candidate samples 228, color names 32 and color IDs 32 contained in working area 204. In some embodiments, a "buy/send" option button 232 is provided such that when the "buy/send" button is selected by a user the device 10 exports information (such as color ID's 32) on the color candidate samples 228 over network 90 to a Web-based store front hosted at server 80 or another server so that the user can purchase paints or surface coverings that correspond to the color candidate samples. In the case of a store-located color selection device 10, selecting the "buy/send" option may just send the color candidate information through a local area network to a computer at a paint mixing station. In some embodiments, a "Scan Sample" option button 234 is provided that links to an interface that allows a user to scan a color element using color scanner 40, and have a representation of that color element appear as a color element 228 in working area 204 so that the user can then get feedback as to what color elements 211 from color group region 202 work with the user supplied sample from a color harmony and color emotion perspective. Thus a user could for example be aided in selecting paint colors to go with a particular fabric color that they scan into the color selector system 10. Color scanner 40 may include, among other things, a spectrophotometer, a camera, or another type of CIE compliant color measuring device.

Figure 14A:
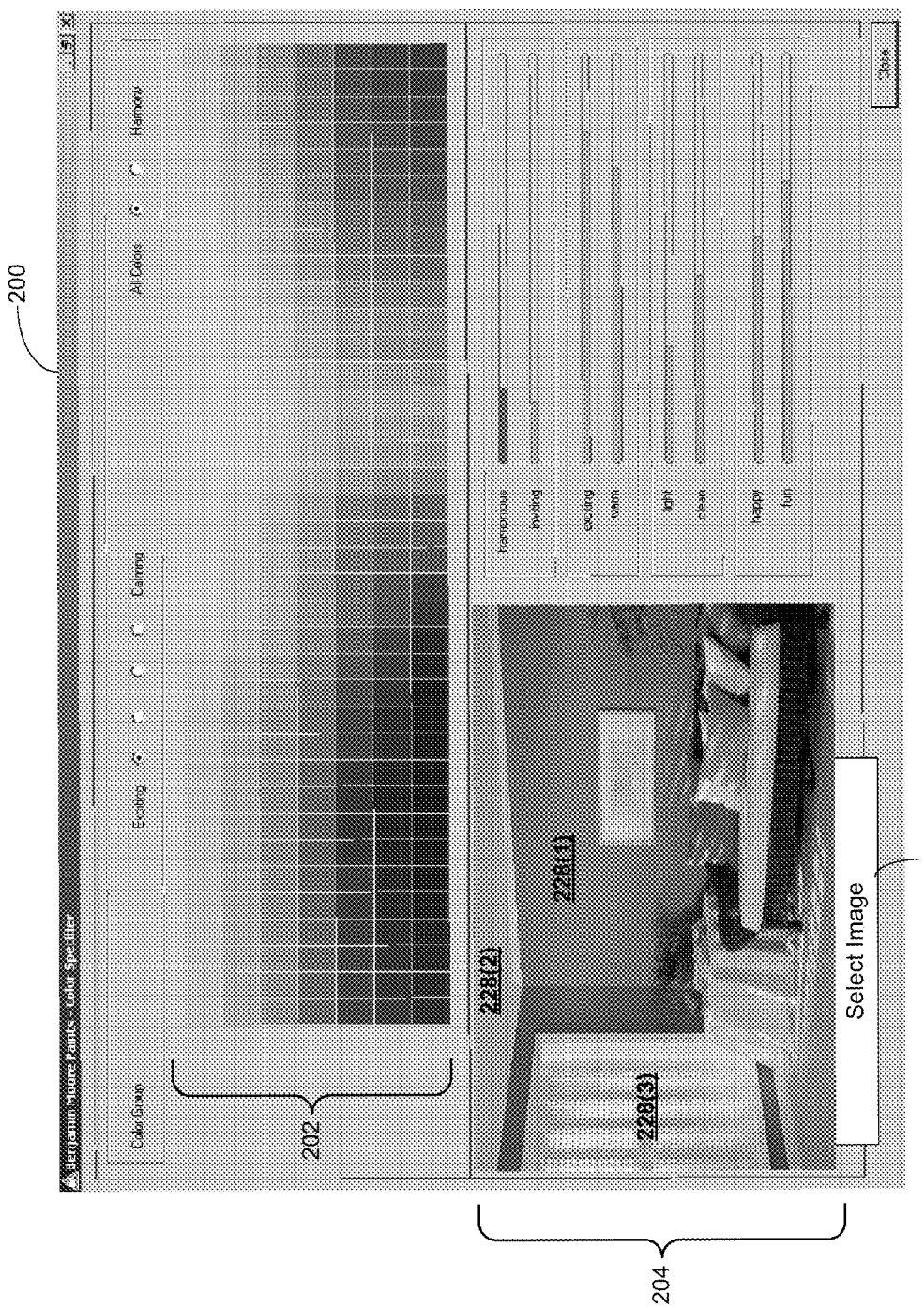
FIGS. 14A, 14B and 14C shows other examples of a user interface, similar to the interface of FIG. 2.

In some example embodiments, the working area 204 can display the selected or scanned color candidate samples 228 in images that simulate actual environments in which the colors would be applied—for example in FIG. 14A the color candidates 228(1), 228(2) and 228(3) are shown in working area 204 applied to respective surfaces in an image that represents an interior image of a house. In at least some example embodiments, the interface includes a "select image" option button 240 that allows the user to browse and select a background image for the working area 204. Color elements can then be selected from color group area 202 for the selected image. The user selectable images could for example come from a pre-defined library of images provided with the color selection application 60, or may be a user supplied image— for example an image from a picture that the user has taken of the interior or exterior or his or her home.

Figure 14B:
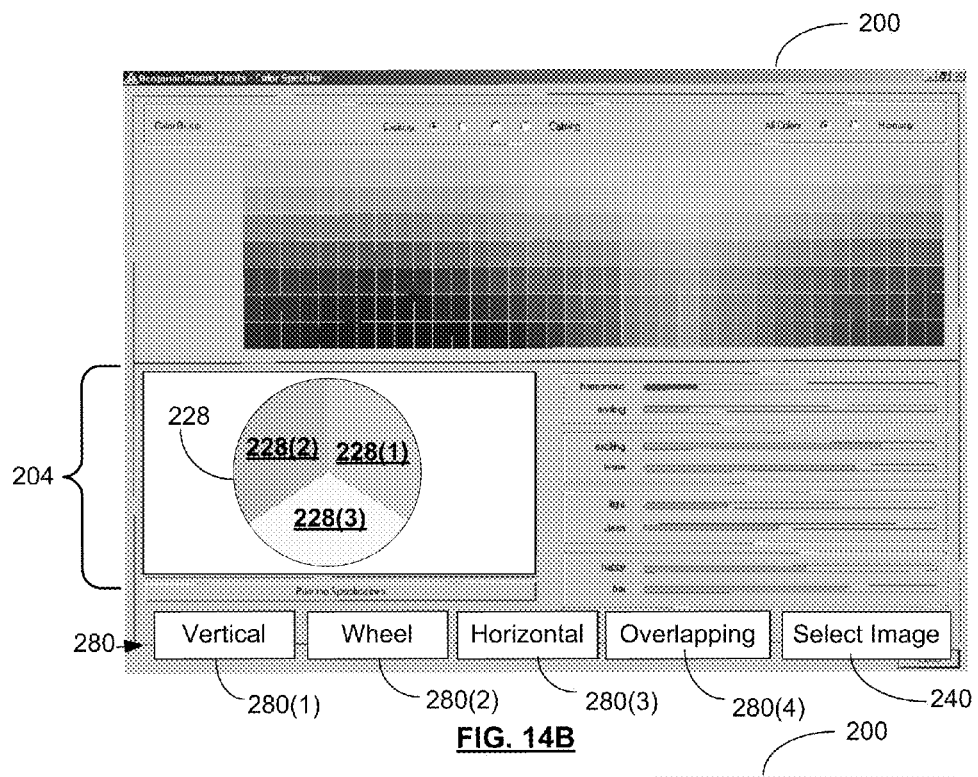
Figure 14C:
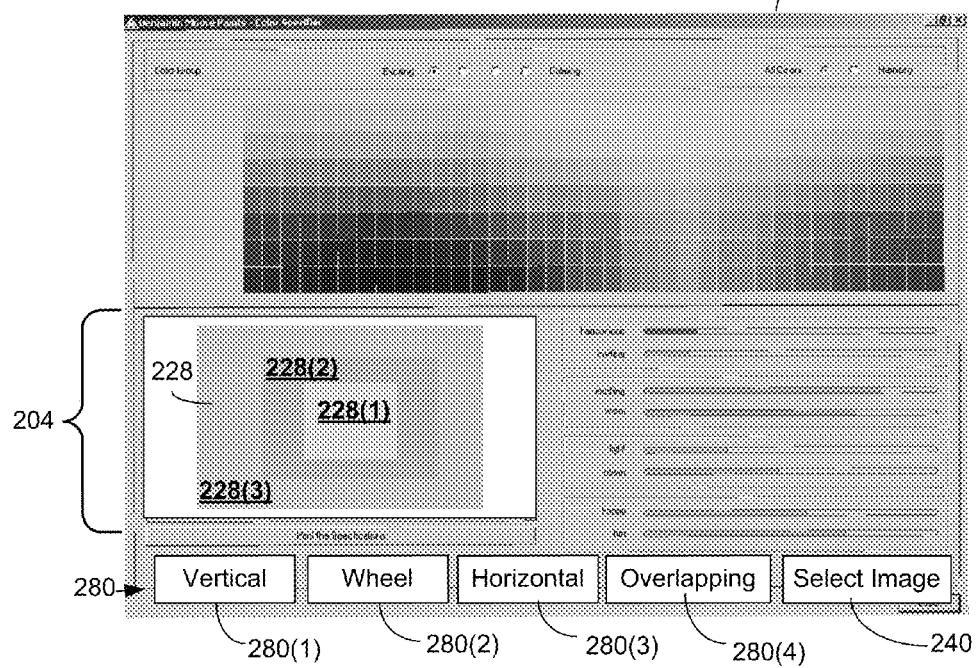

FIGS. 14B and 14C represent an example embodiment in which user interface 200 is configured to allow the user to select different options for displaying color candidate samples 228 in the working area 204. In particular, FIGS. 14B and 14C show a working area toolbar 280 integrated into the interface 200 that allows user selectable options of "vertical"280(1); "wheel" 280(2); "horizontal" 280(3); and "overlapping" 280(4). Such options can be presented in a variety of different ways, including for example in as buttons in a toolbar row as shown in FIGS. 14B and 14C, or in a drop down menu, etc. In some embodiments, the "select image" option 420 discussed above can be part of toolbar 280. Selection of the "vertical" option 280(1) causes the candidate color elements 228 to be displayed in a vertical column as shown in FIG. 2 for example. Selection of the "horizontal" option 280(3) causes the color candidate samples 228 to be presented side-by-side in a row (i.e. perpendicular relative what is shown in the working area 204 of FIG. 2). Selection of the "wheel" option 280(2) causes the candidate color options 228 to be displayed in a color wheel as shown in FIG. 14B. It will be appreciated that in a three-color wheel all colors are adjacent each other which can cause a difference in the color "harmony" score and the color emotion "inviting-uninviting" scores than when the color candidate samples 128 are displayed with non-adjacent colors as shown in FIGS. 2, 14A and 14B.

Selection of the "overlapping" option causes the color candidate samples 228 to be presented in a layered or overlapping fashion as shown in FIG. 14C. In some example embodiments, users can drag and drop the color candidate samples 228 in working area 204 to reorganize them.

Figure 15:
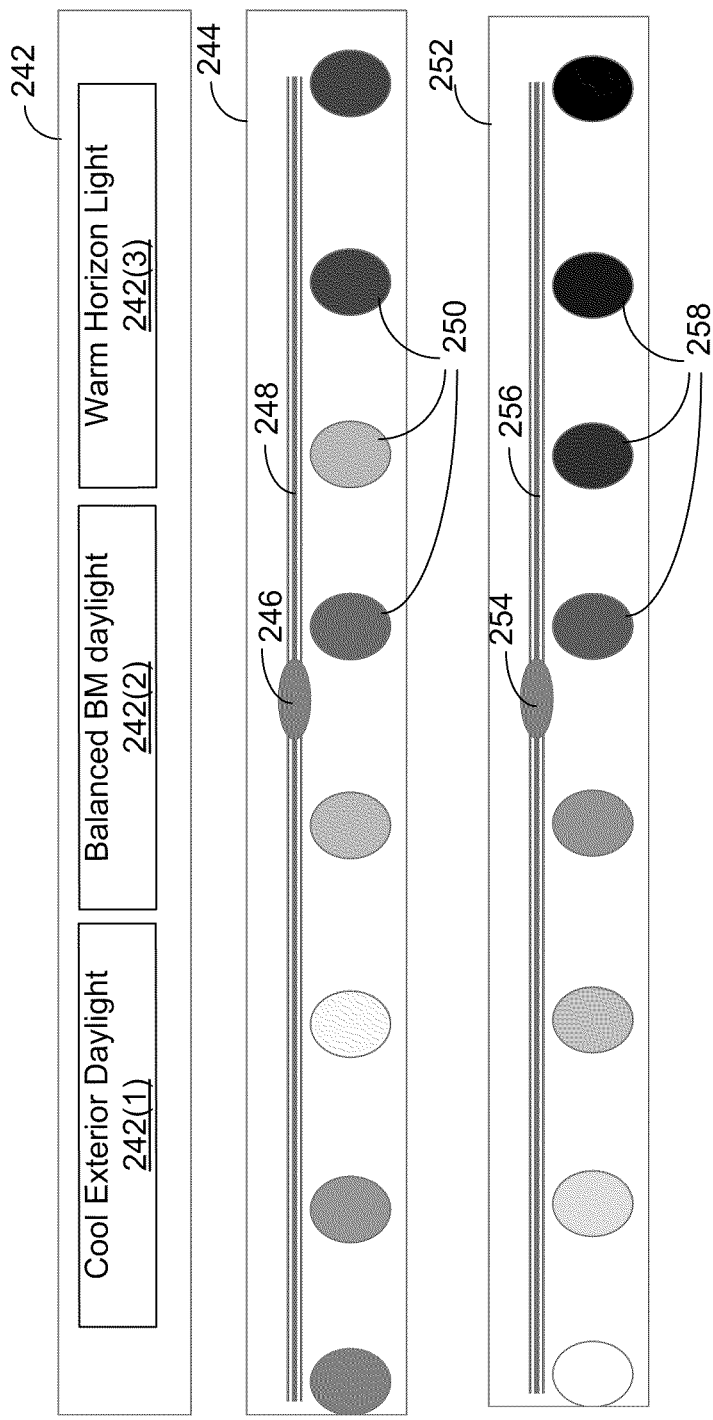
FIG. 15 shows examples of various user selectable options that can be incorporated into the interface of FIG. 2.

FIG. 15 illustrates different user selectable options that can be incorporated into the user interface 200 of any of the previous Figures in different example embodiments. As known in the art, the CIELAB values for representing colors inherently assume certain defined viewing conditions or perceptual attributes including lighting conditions. In at least some example embodiments the user interface 200 includes options that allow a user to modify one or more perceptual attributes of the colors included in the color library 62. By way of example, FIG. 15 includes a lighting options toolbar 242 (also shown in FIG. 13) that can be incorporated into interface 200 and which includes user selectable buttons 242 (1), 242(2) and 242(3) for selecting different simulated lighting options for adapting the colors to different lighting conditions, including for example a "Cool Exterior Daylight" option, a "Balanced BM (Benjamin Moore) Daylight option and a "Warm Horizon Light" option. Each of the lighting options is associated with one or more adaptation values (for example a different spectral lighting distribution value) that causes a corresponding change in the color elements 211 and candidate color elements 228 displayed in the color group display region 202 and working region 204, respectively, as well as in the color harmony and color emotion scores displayed in region 206.

In making such adaptations, the color selection application 60 may, for example, apply equations associated with color appearance models such as those defined by CIECAM97 and CIECAM 02 that allow CIELAB color values to be correlated to different perceptual attributes. Thus, the "lighting options" toolbar 242 allows users to see a representation of how colors would appear across a range of different lighting conditions, with the added benefit of viewing color harmony and color emotion scores across the different lighting conditions. In addition to different perceived lighting conditions, other or additional tool bars could also be used in interface 200 to allow users to selectively choose variation in other perceptual attributes, including for example brightness, lightness, chroma, saturation, colorfulness and hue.

FIG. 15 also shows a hue range selection toolbar 244 having a user movable button 246 on a sliding scale 248 that allows a user to specify a desired hue range with reference to visual hue color indicators 250. In an example embodiment, the colors of a color group shown in color group region 202 will be limited to those falling within the user selected hue range. Hue range selection can also be provided through selection options other than a sliding scale, for example with a discrete scale or a numeric pull-down scale.

FIG. 15 also shows a desired color depth selection toolbar 252 having a user movable button 254 on a sliding scale 256 that allows a user to specify a desired color depth hue range with reference to grey scale indicators 258. In an example embodiment, the colors of a color group shown in color group region 202 will be limited to those satisfying the desired color depth range. Color depth range selection can also be provided through selection options other than a sliding scale, for example with a discrete scale or a numeric pull-down scale. (Note: the color depth parameter for interface 200 can be replaced by the lightness parameter to generate a new set of color effects because of their color quality difference. Lightness is an attribute of color by which a color is perceived to be lighter or darker relative to a gray scale from white to black. Color depth is an attribute of color by which a color is perceived to be heavier or lighter dependent on the colorant concentration loading to the substrate. The later term is usually related to both the lightness and chroma of the color.)

Figure 16:
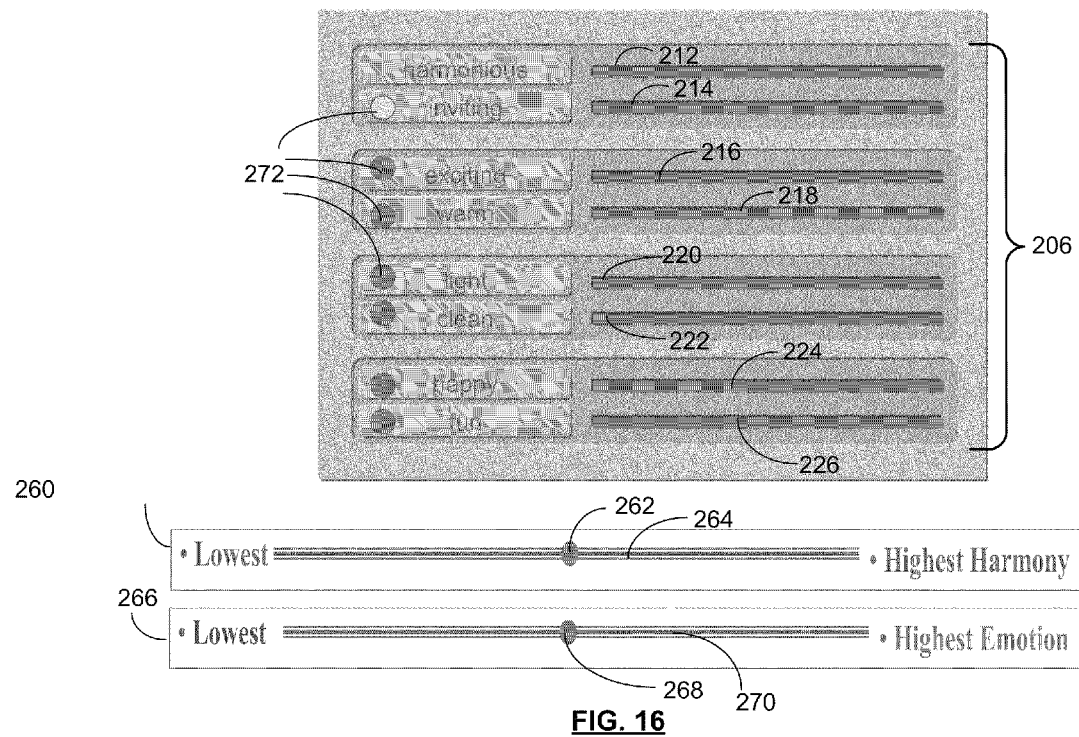
FIG. 16 illustrates additional user selectable options that can be incorporated into the interface of FIG. 2.

FIG. 16 shows a modified version of color information region 206, along with a color harmony selection tool bar 260 and a color emotion selection toolbar 266 that can be incorporated into the user interface 200 of any of the previous figures with or without the toolbar options shown in FIG. 15. Furthermore, the color harmony selection tool bar 260 and the color emotion selection toolbar 266 can each be incorporated into the user interface 200 either together, or exclusive of each other, in different embodiments. As noted above, in one embodiment the binary user selectable options of "All Colors" and "Harmony" 210 in color group toolbar 205 can be replaced with a harmony option allowing more than two selections, and the color harmony selection tool bar 260 is an example of such an alternative. In one example embodiment, the color harmony tool bar 260 includes a button 262 movable along a continuous scale 264 between a position representing "Lowest Harmony" and a position representing "Highest Harmony". The colors represented in the color group display region 202 of interface 200 will be limited only to colors within the selected color group that meet the desired harmony level. In place of a continuous sliding scale, other harmony level selection options can be used, including for example discrete scale or a numeric pull-down scale.

The color emotion tool bar 266 is provided to allow a user to specify a desired color emotion level for color emotions that correspond to one or more of the color emotion scales 212-226, and includes a button 268 movable along a continuous scale 270 between a position representing "Lowest Emotion" and a position representing "Highest Emotion". In one example embodiment, a user selectable button 272 is displayed beside each of the color emotion scales 212-226, and in order to use the desired color emotion level for a specific color emotion, the user selects the button 272 associated with that specific color emotion, and then slides the selection button 268 to a desired location on the scale 270. In the illustrated example embodiment, the central position on the scale 270 represents the neutral default position that will encompass the greatest number of colors. Thus, by using the color emotion-tool bar 266 in combination emotion selection buttons 272 a user can selectively specify desired color emotion levels for one or more of the color emotion scales, and the colors of the selected color group currently displayed in region 202 will be limited to the colors that meet the specified color emotion levels. It will be appreciated that several different alternative interface configurations could be used for setting the color emotion levels, including for example a discrete scale, and a numeric pull down scale. Furthermore, individual tool bars 266 could be simultaneously displayed for each of the color emotions parallel to the feedback scales 212-226, rather than having the color emotions all share a single color emotion tool bar 266.

In embodiments where the color emotion tool bar 266 is combined with the color harmony tool bar 260, the colors displayed in region 202 will be limited to those colors that meet both the desired harmony and color emotion levels. Furthermore, in embodiments where hue range selection toolbar 244 and/or the desired color depth selection toolbar 252 are also part of the interface 200, the colors displayed in region 202 will also have to meet the criteria levels specified by such additional toolbars. Accordingly, in example embodiments, the colors samples 211 of a color group that are displayed in color group display region 202 can be selectively filtered in dependence on: the group color harmony score of the displayed group; the "inviting-calming" color emotion score for each color in the displayed group; the "exciting-calming" color emotion score for each color in the displayed group; the "warm-cool" color emotion score for each color in the displayed group; the "light-dark" color emotion score for each color in the displayed group; the "clean-dirty" color emotion score for each color in the displayed group; the "happy-depressing" color emotion score for each color in the displayed group; and the "fun-serious" color emotion score for each color in the displayed group; and combinations of the forgoing.

In the above described embodiment, the color elements 211 displayed in color group region 202 as filtered according levels specified through color harmony tool bar 260 and/or color emotion tool bar 266 are determined a presented without regard to what user selected color candidate samples 228 are presently in working region 204. However, in some example embodiments, once one or more user selected color candidate samples 228 are located in working area 204, the color elements 211 that are shown in color group area 202 are determined based on which colors meet the harmony and/or color emotion levels specified through color harmony tool bar 260 and/or color emotion tool bar 266 when combined with the current user selected candidate color element or samples 228. Thus, in such embodiments, a user can select one or more color elements 211 as color candidate samples 228, then specify a desired color harmony or color emotion level(s), and then be presented in color group region 202 with the subset of colors from the existing color group that will meet the user specified desired color harmony or color emotion level(s) when combined with the already selected candidate color element or samples 228. In effect the color selection device 10 suggests colors to the user to combine with colors the user has already selected, and such suggestions are based on quantitative models derived from the reactions of actual test subjects to colors and color combinations. It should be noted that the color elements 228 can also be derived from color elements scanned in by a user from outside of the color library 62, so the user can be provided with color suggestions that meet specified harmony levels and/or color emotion levels when combined with the user supplied color element.

Figure 17:
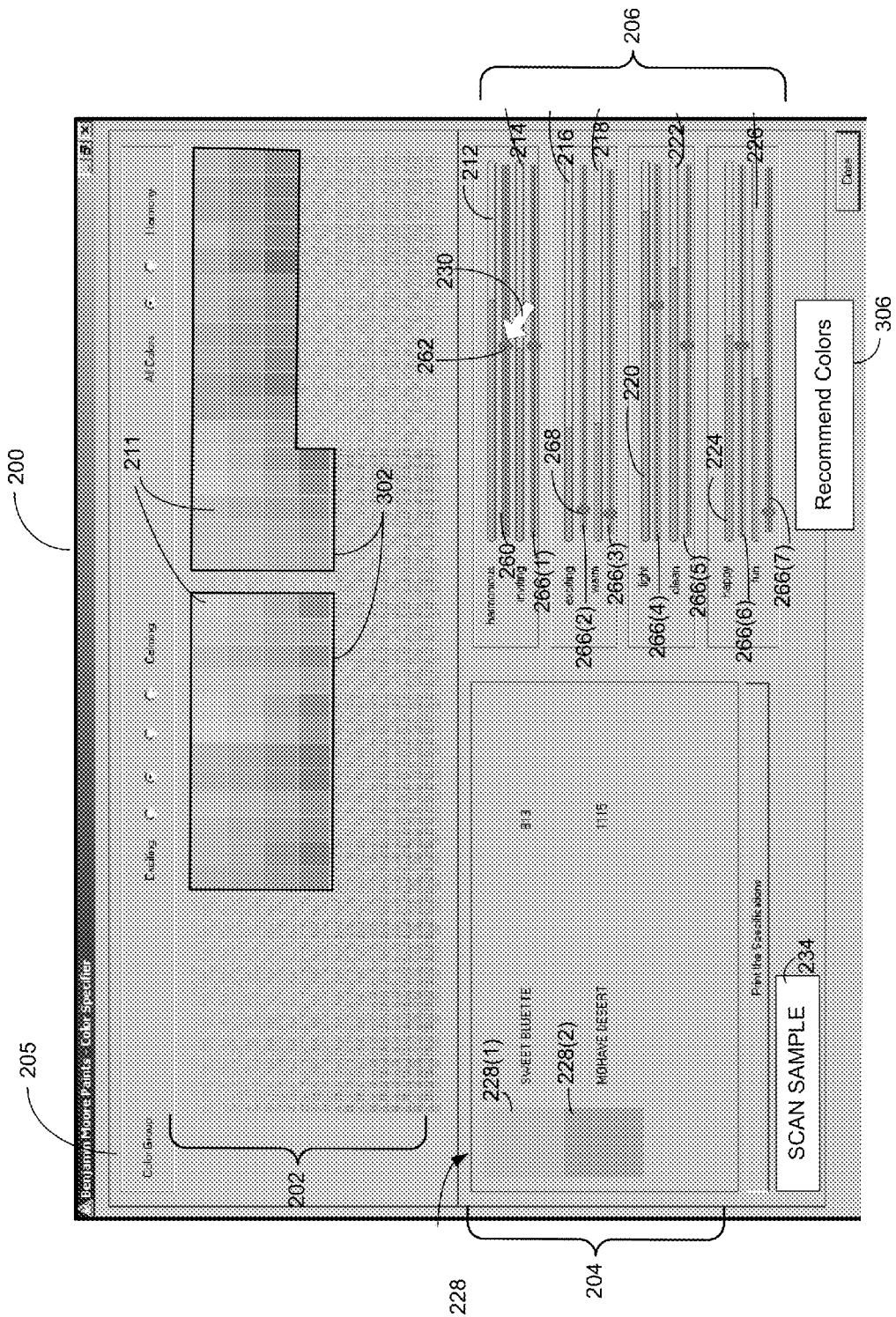
FIG. 17 illustrates another example of color selection user interface similar to that of FIG. 2.

FIG. 17 further illustrates an example embodiment in which user interface 200 of the color selection device 10 can recommend selected colors from a color group to a user of the color selection device 10. The user interface 200 of FIG. 17 varies from the configuration suggested in FIG. 16 in that in FIG. 17 a separate user input sliding tool bar is provided for each of the respective color harmony and color emotion scales so that the user can immediately see the desired color harmony and color emotion score thresholds that they have selected as well as the color harmony and color emotion scores of the color candidate samples 228 currently in working area 204. Thus, as shown in FIG. 17, color harmony tool bar 260 is provided adjacent the color harmony scale 212, and tool bars 266(1)-266(7) are provided adjacent each of the respective color emotion scales 214-226. By manipulating on screen marker 230, a user can slide the color harmony selection button 262 along the toolbar 260 to set a minimum desired color harmony threshold score. Similarly, the respective selection buttons 268 provided on each of the color emotion tool bars 266(1)-266(7) can be slid by a user to set a minimum desired color harmony score for each of the "inviting-calming" color emotion, the "exciting-calming" color emotion, the "warm-cool" color emotion, the "light-dark" color emotion, the "clean-dirty" color emotion, the "happy-depressing" color emotion, and the "fun-serious" color emotion. Based on the color candidate sample(s) 228 currently located in working area 204, and on the color harmony and color emotion score thresholds set using tool bars 260 and 266(1)-266(7), and using the color harmony and color emotion equations discussed above, the color selection application 60 determines which color elements 211 from the color group displayed in the color group display area 202 meet the minimum color harmony and color emotion score thresholds when combined with the color candidate sample(s) 228, and then modifies the color group display region 202 to identify as a suggested color group subset 302 the color elements 211 that meet the criteria. The user can then select color elements 211 from the suggested color group subset 211 to add to working area 204 and be provided with feedback on scales 212-226 about how the selected color combination measures up against the user selected thresholds. In some example embodiments, interface 200 is provided with a user selectable button (for example a "Recommend Colors" button 306) that the user can use to trigger the device 10 to determine what colors meet the user specified human perception criteria levels. In such an embodiment, once the user sets scales 260 and 266(1)-266(7) to the desired level and then selects the "recommend colors" button 306 the color selection application 60 determines which color elements 211 meet the specified criteria and modifies display region 202 accordingly.

In the example embodiment illustrated in FIG. 17, the suggested color group subset 302 is highlighted relative to the color elements that did not meet the set criteria in that color elements that did not meet the criteria are faded or visually muted or at least partially obscured. In some embodiments, such "rejected" color elements that are not part of the suggested color group subset 302 could be completely removed from the color group display region 202 or distinguished in another manner.

This, in the embodiments of FIGS. 16 and 17, the color selection device 10 can filter the color elements 211 presented in the color group display region 202 to identify only those color elements 211 that can be combined with previously selected candidate color elements 228 to achieve a user specified color harmony level and/or one or more user specified color emotion levels.

Figure 18:
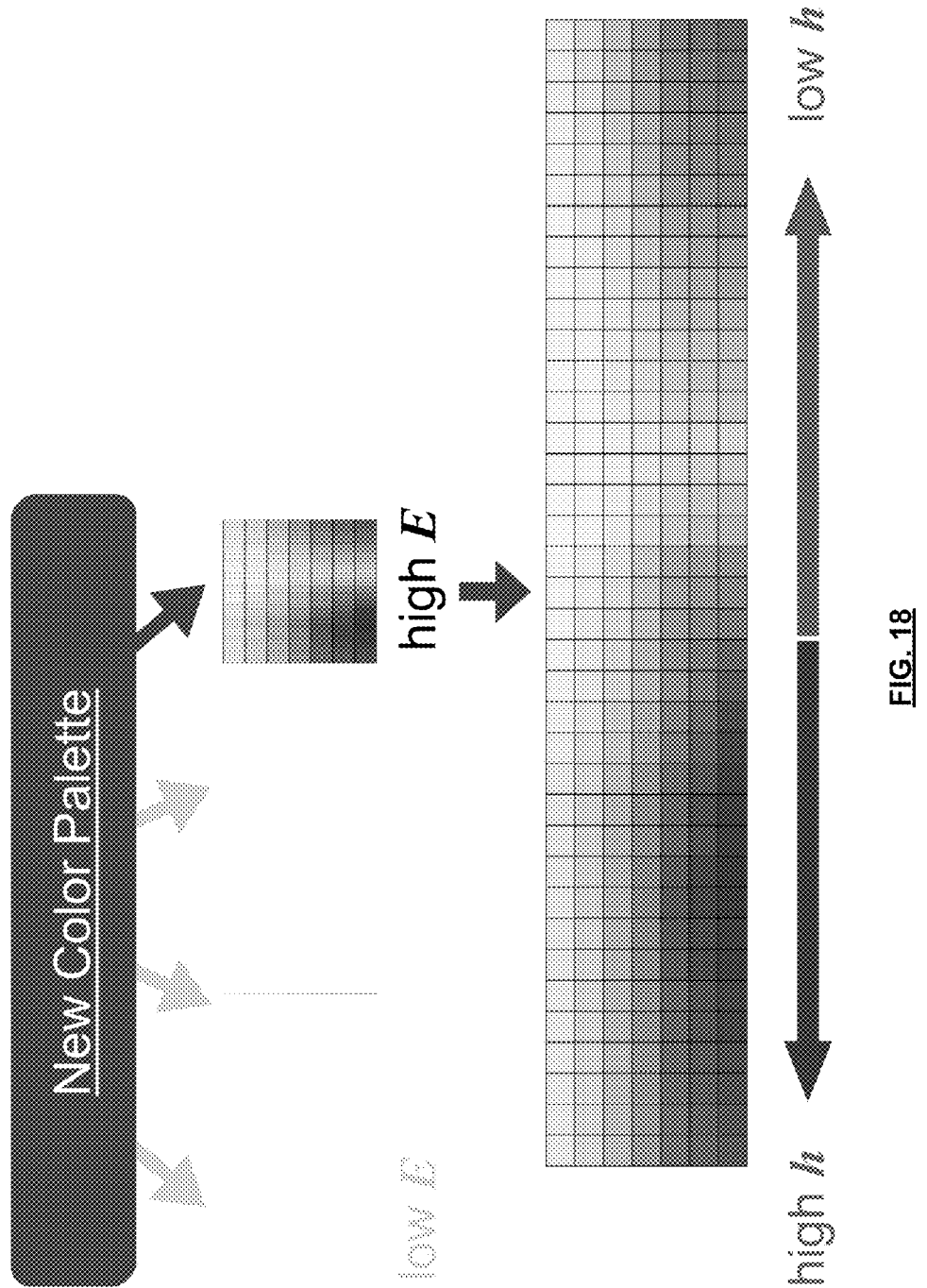
FIG. 18 illustrates a new color library sorting function.

In some embodiments the color selection application 60 allows users to import a new color library 62, and sorts the colors into respective color groups (eg. into color groups E1, E2, E3 and E4) based, for example, on where the colors fall within the Exciting-Calming scale and the hue and lightness of the colors, as represented in FIG. 18.

In at least some example embodiments, the color data specified in color library 62 may take a form other than CIELAB data, including for example XYZ data (under either D65, A, F2, TL 84 or other predefined light source) or reflectance data (R %). In such cases, the different color data format can either be converted to CIELAB format and then used in the above equations, or alternatively the equations modified for the different format. By way of example, in one embodiment a dynamic link library (DLL) is used to calculate specific color emotion (CE) or color harmony (CH) values as shown in FIG. 19.

In some example embodiments, discrete scales are used to represent color harmony and color emotion values, for example using the numbers 1 to 10 represent discrete degrees for each scale; 10 means highest degree for the first term in each word pair, i.e. "light", "warm", "exciting", "fun", "happy", "clean", "inviting" and "harmonious"; 1 means highest degree for the second term, i.e. "dark", "cool", "calming", "serious", "depressing", "dirty", "uninviting" and "disharmonious". Table 6 below shows cell values that define the range of CE or CH values that correspond to a discrete degree shown in the left column.

TABLE 6

Determination of discrete scales for CEs and CH

| | dark-light | warm-cool | exciting-calming | fun-serious | happy-depressing | clean-dirty | inviting-uninviting | harmonious-disharmonious |
|---|---|---|---|---|---|---|---|---|
| 1 | <−1.23 | <−1.04 | <−0.23 | <−1.12 | <−0.85 | <−1.28 | <−0.72 | <−0.98 |
| 2 | −1.23~−0.85 | −1.04~−0.72 | −0.23~0.18 | −1.12~−0.60 | −0.85~−0.52 | −1.28~−0.91 | −0.72~−0.29 | −0.98~−0.71 |
| 3 | −0.85~−0.48 | −0.72~−0.40 | 0.18~0.58 | −0.60~−0.09 | −0.52~−0.18 | −0.91~−0.54 | −0.29~0.15 | −0.71~−0.45 |
| 4 | −0.48~−0.10 | −0.40~−0.07 | 0.58~0.98 | −0.09~0.42 | −0.18~−0.15 | −0.54~−0.17 | 0.15~0.58 | −0.45~−0.19 |

TABLE 6-continued

Determination of discrete scales for CEs and CH

|    | dark-light | warm-cool | exciting-calming | fun-serious | happy-depressing | clean-dirty | inviting-uninviting | harmonious-disharmonious |
|----|------------|-----------|------------------|-------------|------------------|-------------|---------------------|--------------------------|
| 5  | −0.10~0.28 | −0.07~0.25| 0.98~1.39        | 0.42~0.93   | 0.15~0.49        | −0.17~0.21  | 0.58~1.01           | −0.19~0.08               |
| 6  | 0.28~0.65  | 0.25~0.57 | 1.39~1.79        | 0.93~1.45   | 0.49~0.83        | 0.21~0.58   | 1.01~1.45           | 0.08~0.34                |
| 7  | 0.65~1.03  | 0.57~0.89 | 1.79~2.19        | 1.45~1.96   | 0.83~1.16        | 0.58~0.95   | 1.45~1.88           | 0.34~0.60                |
| 8  | 1.03~1.40  | 0.89~1.21 | 2.19~2.59        | 1.96~2.47   | 1.16~1.50        | 0.95~1.32   | 1.88~2.31           | 0.60~0.86                |
| 9  | 1.40~1.78  | 1.21~1.53 | 2.59~3.00        | 2.47~2.98   | 1.50~1.84        | 1.32~1.69   | 2.31~2.75           | 0.86~1.13                |
| 10 | >1.78      | >1.53     | >3.00            | >2.98       | >1.84            | >1.69       | >2.75               | >1.13                    |

In example embodiments the color selection system embodiments described herein may be used to assist people with paint selection, however it can also be applied to other areas where color coordination is of value, such as in selecting fabrics for furniture, wall covering colors, broadloom colors, and appliance colors, to name but a few possible applications.

In at least one example embodiment, the color selection device 10 is configured as a handheld electronic device having a housing that holds the display 22, storage samples 24, 26, controller 38, a user input device 28, and a color scanner 40 (for example a spectrophotometer). Using such a compact mobile device a designer or other device user can easily scan and input colors at various locations and immediately combine the scanned colors as color candidate samples 228 with either other scanned colors or with colors selected from color library 62 and receive color harmony and color emotion scores and/or suggestions as to what colors from the color library 62 can be combined with the scanned color(s) to achieve desired color harmony or color emotion values. In at least one example embodiment, user input to the device 10 is carried out through voice commands.

As suggested above, in at least some example embodiments, the color selection application 60 could be a web based application hosted at color selection server 80 such that user inputs from a remote user color selection device 10 would be received at color selection server 80 through network 90, and color emotion and color harmony information (and other information contained din interface 200) determined at server 80, and then sent back though network 90 for presentation to the user at device 10.

In some example embodiments some or all of the color emotion and color harmony scores for colors and color combinations may be predetermined and stored in look-up-tables that are part of or associated with color library 62.

In some example embodiments described above, color harmony scores and at least one color emotion score can be dependent on the relative positioning of colors in a color combination. In further example embodiments, the relative proportionality of color candidate samples 228 can also affect color harmony (and in some cases, color emotion) values. In one example embodiment, the relative size or proportions of candidate color elements in working area 204 can be specified by a user, and this information taken into account when determining color harmony (and in some cases color emotion). For example, in one example embodiment, navigation tool 230 can be used by a user to adjust the relative sizes of the color boxes shown in area 204 of FIG. 14C, or the relative sizes of the different colored surfaces in area 204 of FIG. 14A, and the proportionality of the color samples then used when determining color harmony for the combination. A model for taking proportionality into account when determining color harmony is shown for example in (6) Wang, X., Ou, L., Luo, M. R., "Influence of Area Proportion on Colour Harmony", International Conference on Color Harmony, Budapest Hungary, Apr. 24-26, 2007, which is incorporated herein by reference. As indicated in the above paper, a three color harmony model considering area proportions (a:b:c) can be represented as follows:

$$CH_{(a:b:c)} = -0.96 + 1/(a+b+c)[(a+b)CH_{ab} + (b+c)CH_{bc} + (c+a)CH_{ca}]$$

In which a, b, and c represent areas of three constituent colors in a combination; $CH_{ab}$, $CH_{bc}$ and $CH_{ca}$ represent harmony values for "sub-combinations" of constituent colors a and b, b and c and c and a, respectively and are determined by the following:

$$CH_{ij} = \frac{1}{2}H_c + H_L$$

where $$H_C = 0.04 + 0.53 \tan h(0.8 - 0.045\Delta C)$$

$$\Delta C = [(\Delta H^*_{ab})^2 + (\Delta C^*_{ab}/0.5)^2]^{1/2}$$

$$HL = H_{Lsum} + H_{\Delta L}$$

$$H_{Lsum} = 0.28 + 0.54 \tan h(-3.88 + 0.029 L_{sum}) \text{ in which } L_{sum} = L^*_1 + L^*_2$$

$$H_{\Delta L} = 0.14 + 0.15 \tan h(-2 + 0.2\Delta L) \text{ in which } \Delta L = |L^*_1 + L^*_2|$$

where L*, $C^*_{ab}$ and $h_{ab}$ are CIELAB values for lightness, chroma and hue angles, respectively; $\Delta L$, $\Delta C^*_{ab}$ and $\Delta H^*_{ab}$ represent CIELAB color difference values in lightness, chroma and hue, respectively.

In at least some example embodiments, user information and/or information about user interaction with interface 200 is gathered at a server such as color selection server 80 and analyzed to gather information about colors selected as color candidate elements by users and to track other user interaction details.

A number of different features have been described above in respect of various example embodiments. It will be appreciated that a number of the features can be applied across all of the example embodiments even if not expressly stated above.

The above-described embodiments of the present application are intended to be examples only. Alterations, modifications and variations may be effected to the particular embodiments by those skilled in the art without departing from the scope of the application, which is defined by the claims appended hereto.

The invention claimed is:

1. A computer implemented color selection method, comprising:
   selecting a group of known colors;
   receiving user input through a visual user interface identifying a user chosen color;

receiving user input identifying a threshold for a first color emotion based on a first human psychophysical perception, wherein the threshold comprises a numerical color emotion score and wherein the first color emotion comprises at least one of exciting-calming, light-dark, clean-dirty, happy-sad, fun-serious, warm-cool, or inviting-uninviting color emotion;

selecting, using a controller, in dependence on a first mathematical model that models the first human psychophysical perception, which colors in said group of known colors would achieve the threshold for the first color emotion when combined with the user chosen color and with each other, wherein the first color emotion comprises a bi-polar emotion scale having a plurality of levels between end points and wherein the first mathematical model is based on psychophysical responses of a plurality of test subjects to a plurality of test colors indicating a degree of color emotion on the bi-polar emotion scale for the plurality of test colors; and providing an output for the user identifying the selected colors on the visual user interface.

2. The method of claim 1 comprising:

displaying in the visual user interface a color group display region that includes color elements representing at least part of the group of known colors;

and wherein providing an output identifying the selected colors includes modifying the color group display region to identify the color elements that represent the selected colors.

3. The method of claim 2 wherein modifying the color group display region to identify the color elements that represent the selected colors includes fading or removing the color elements that do not represent the selected colors.

4. The method of claim 2 comprising displaying on the visual user interface a sliding bar representative of different levels of the first human psychophysical perception, and wherein receiving user input identifying a desired first color emotion threshold for the first human psychophysical perception is done in dependence on user manipulation of the sliding bar.

5. The method of claim 2 comprising:

receiving a user input identifying one of the color elements that represents one of the selected colors;

calculating, using the first mathematical model, a first human psychophysical emotion value that models the first human psychophysical perception of a color combination comprising the selected color represented by the identified color element from the preceding step and the user chosen color; and presenting in the visual user interface a representation of the first human psychophysical emotion value.

6. The method of claim 2 wherein a plurality of user inputs identifying a plurality of color emotion thresholds each corresponding to a different human color perception are received, and wherein selecting the selected colors comprises selecting which colors in the group of known colors will achieve the desired color emotion thresholds when combined with the user chosen color.

7. The method of claim 2 wherein a plurality of user inputs identifying a plurality of user chosen colors are received, and wherein selecting the selected colors comprises selecting which colors in the group of known colors will achieve a desired first color emotion threshold when combined with a color combination that includes the plurality of user chosen colors.

8. The method of claim 7 comprising:

displaying in a color candidate display region of the visual user interface a plurality of color candidate samples that each represent a respective one of the user chosen colors.

9. The method of claim 8 wherein receiving the user input identifying at least one of the user chosen colors includes user selection of one of the displayed color elements in a first color display region.

10. The method of claim 8 wherein receiving the user input identifying at least one of the user chosen colors includes receiving an input from an optical color measuring device representative of a color measured thereby.

11. The method of claim 8 wherein receiving the user input identifying at least one of the user chosen colors includes receiving a user input color code identifying a unique color.

12. The method of claim 8 wherein displaying the plurality of color candidate samples comprises displaying an image of a structure with the color candidate samples each shown on a respective surface displayed in the image.

13. The method of claim 8 including applying color attributes and relative size information of the plurality of color candidate samples to a mathematical color harmony model to generate a color harmony score for the plurality of color candidate samples, and displaying the color harmony score.

14. The method of claim 8 comprising presenting a plurality of selectable display formats and, upon receiving a user input selecting one of the selectable display formats that is different than a current display format, changing a format in which the color candidate samples are displayed.

15. The method of claim 1 including:

receiving a user input indicating a different perceptual attribute for viewing colors and modifying inputs provided to the first mathematical model in accordance with the different perceptual attribute.

16. The method of claim 15 wherein the different perceptual attribute corresponds to a change in lighting conditions.

17. The method of claim 1 further comprising:

receiving user input identifying a desired hue range;

selecting, in dependence on the desired hue range, which of the selected colors fall within the desired hue range; and providing an output for the user identifying the selected colors that fall within the desired hue range.

18. The method of claim 1 further comprising:

receiving user input identifying a desired color depth range;

selecting, in dependence on the desired color depth range, which of the selected colors fall within the desired color depth range; and providing an output for the user identifying the selected colors that fall within the desired color depth range.

19. The method of claim 1 further comprising the step of receiving user input identifying a desired color harmony threshold based on human psychophysical perception;

wherein the step of selecting using the controller further including a further dependence on a color harmony mathematical model based on human psychophysical perception and wherein the selected colors would also achieve the desired color harmony threshold.

20. The method of claim 1, wherein the degree of color emotion is on a 10-category scale.

21. A computer implemented color selection method, comprising:

selecting a color library comprising a plurality of colors;

receiving user input through a visual user interface identifying a plurality of thresholds for color emotions based on human psychophysical perceptions, wherein each threshold comprises a numerical color emotion score and wherein each color emotion comprises at least one of exciting-calming, light-dark, clean-dirty, happy-sad, fun-serious, warm-cool, or inviting-uninviting color emotion;

filtering, using a controller without consideration of a user-chosen reference color and in dependence on mathematical models that model said human psychophysical perceptions, the plurality of colors in the color library to color or colors that would achieve said plurality of threshold, wherein each color emotion comprises a bi-polar emotion scale having a plurality of levels between end points and wherein the mathematical models are based on psychophysical responses of a plurality of test subjects to a plurality of test colors indicating degrees of color emotions on the bi-polar emotion scales for the plurality of test colors; and displaying said filtered color or colors on the visual user interface.

22. The method of claim 21 further comprising
receiving user input identifying a desired color harmony threshold based on human psychophysical perception;
wherein the step of filtering includes a further dependence on a color harmony mathematical model based on human psychophysical perception, and the filtered colors would also achieve the desired color harmony threshold.

23. The method of clam 21, wherein the degrees of color emotions are on 10-category scales.

\* \* \* \* \*